(12) United States Patent
Ohji et al.

(10) Patent No.: US 6,393,919 B1
(45) Date of Patent: May 28, 2002

(54) PRESSURE SENSOR WITH A THERMAL PRESSURE DETECTING ELEMENT

(75) Inventors: Hiroshi Ohji; Kazuhiko Tsutsumi; Yuichi Sakai; Naoki Yutani, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/644,693

(22) Filed: Aug. 24, 2000

Related U.S. Application Data

(63) Continuation of application No. PCT/JP99/02955, filed on Jun. 3, 1999.

(30) Foreign Application Priority Data

Dec. 24, 1998 (JP) ........................................... 10-367843

(51) Int. Cl.[7] .............................................. G01L 19/04
(52) U.S. Cl. ...................................................... 73/708
(58) Field of Search ................... 73/706, 708, 715–728; 338/2, 3, 4, 42; 361/283.1–283.4

(56) References Cited

U.S. PATENT DOCUMENTS

| | | | |
|---|---|---|---|
| 3,416,373 A | 12/1968 | Havens | |
| 4,134,304 A | 1/1979 | Yamamoto | |
| 4,197,743 A | 4/1980 | Dauphinee | |
| 4,682,503 A | 7/1987 | Higashi et al. | |
| 4,873,870 A | * 10/1989 | Delatorre | 73/718 |
| 4,924,701 A | * 5/1990 | Delatorre | 73/706 |
| 5,167,158 A | * 12/1992 | Kamachi et al. | 73/727 |

FOREIGN PATENT DOCUMENTS

| | | |
|---|---|---|
| FR | 1 299 485 | 6/1962 |
| GB | 1 046 458 | 10/1966 |
| JP | 3-170037 | 7/1991 |
| JP | 06241933 A | 9/1994 |
| JP | 3-238334 | 10/1994 |
| JP | 08184514 A | 7/1996 |
| JP | 11-44601 | 2/1999 |
| RU | 742734 | 6/1980 |

* cited by examiner

Primary Examiner—William Oen
(74) Attorney, Agent, or Firm—Oblon, Spivak, McClelland, Maier & Neustadt, P.C.

(57) ABSTRACT

A pressure sensor of the present invention comprises a diaphragm 6 having a first surface which receives pressure and a thermal detecting portion 3 with a heat sensitive portion disposed as to oppose the diaphragm through a spacer, wherein displacement values of the diaphragm owing to variations in pressure are detected at the thermal detecting portion as variation values of thermal equilibrium state. With this arrangement, a surface of the diaphragm which directly receives pressure from measuring fluid does not need to undergo film forming or photolithographic processes whereby main portions of thermal pressure detecting elements might be formed onto a silicon substrate by large quantities in a lump sum through simple manufacturing processes so that it is possible to improve accuracy and reliability of the thermal pressure detecting elements and to obtain a pressure sensor of low cost.

17 Claims, 18 Drawing Sheets

PRESSURE SENSOR WITH A THERMAL PRESSURE DETECTING ELEMENT

This application is a Continuation of Int. PCT Appln. Ser. No. JP99/02955 filed on Jun. 3, 1999.

TECHNICAL FIELD

The present invention relates to a pressure sensor for measuring pressure, and particularly to a pressure sensor for measuring, by using a thermal pressure detecting element, heat quantities deprived by means of a pressure receiving diaphragm which is disposed as to oppose a heating element included in the thermal pressure detecting element or a portion heated by the heating element with being remote therefrom by a specified distance.

BACKGROUND ART

A pressure sensor wherein a deflection value of a diaphragm is measured based on a substantially non-ambiguous functional relationship that is satisfied between a pressure of a measuring fluid and a deflection value of the diaphragm formed on a cylindrical body which receives pressure of the fluid with the use of a strain gage formed onto the diaphragm through film forming techniques or photolithographic techniques for obtaining the pressure of the fluid proportional to the deflection value of this diaphragm is widely applied for detecting an amount of absorbed air of an internal combustion engine or for detecting a hydraulic pressure of a brake of a vehicle.

FIG. 22 is a sectional view of a conventional pressure sensor as disclosed, for instance, in Japanese Unexamined Utility Model Publication No. 137242/1986 (microfilm of Japanese Utility Model Application No. 19572/1985).

In FIG. 22, numeral 101 denotes a metallic cylindrical body, numeral 102 a semiconductor single crystalline plate including a strain gage 103, wherein the semiconductor single crystalline plate comprises, for instance, a silicon substrate. In the arrangement of FIG. 22 wherein the semiconductor single crystalline plate 102 is adhered to the metallic cylindrical body 101, the difference in materials between the metallic cylindrical body 101 and the semiconductor single crystalline plate 102 resulted in the fact that strain was apt to occur in the semiconductor single crystalline plate 102 forming the diaphragm owing to difference in coefficients of linear expansion at the time of temperature variations, thereby causing measuring errors. Further, since a pressure of the measuring fluid is directly applied to the semiconductor single crystalline plate 102, a sufficiently strong bonding strength was required between the metallic cylindrical body 101 and the semiconductor single crystalline plate 102.

In FIG. 23, numeral 104 denotes a metallic cylindrical body comprising, for instance, a cut pipe material which might be a stainless steel pipe. A metallic thin film 105 welded to the cylindrical body 104 is formed of a thin plate of rolled material, and owing to the fact that this is a rolled material, it is formed to assume a uniform film thickness as well as a smooth surface. The metallic thin film 105 is formed of a material that is identical to that of the cylindrical body 104. A silicon oxide thin film 106 that functions as an insulating film is formed on an upper surface of the metallic thin film 105. Plasma CVD methods are employed for forming the silicon oxide thin film 106. Then, a silicon thin film forming a strain gage 107 is formed onto the silicon oxide thin film through plasma CVD methods. Etching of the silicon thin film is performed to remove portions other than partial portions of the silicon thin film as shown in FIG. 23, and the strain gage 107 is formed by the remaining silicon thin film. Further, an circuit might be arranged by forming an electrode by performing vapor deposition of metal such as gold on to the strain gage 107, attaching a lead wire to the electrode by means of ultrasonic bonding, and suitably connecting the electrode and the lead wire.

The conventional pressure sensor as shown in FIG. 22 and FIG. 23 is a pressure sensor employing a strain gage wherein the diaphragm is strained through pressure of measuring fluid applied to the diaphragm and the strain is measured by the strain gage on the diaphragm. There is also employed a pressure sensor for detecting a deflection of a diaphragm as a change in capacity.

FIG. 24 is a sectional view (a) and top views (b), (c) of a conventional pressure sensor of capacity detecting type as disclosed, for instance, in Japanese Unexamined Patent Publication No. 56233/1985.

In the drawings, numeral 108 denotes a base having an electrode 109 in a central portion on its upper surface and a correction electrode 110 at its peripheral edge portion, both in a concentric manner, while a through hole 111 is formed in a clearance formed between these electrodes. Numeral 112 denotes a diaphragm having an electrode 113 on its surface as to oppose the electrode 109. Numeral 114 denotes glass beads for gap adjustment interposed between the substrate 108 and the diaphragm 112 for forming a gap 115 between the electrodes 109, 113. The pressure sensor is so arranged that the gap 115 in the central portion becomes smaller when pressure P is applied onto the diaphragm 112 whereby capacitance between the electrodes 109, 113 is increased. By utilizing a substantially non-ambiguous functional relationship that is satisfied between the change in capacity and the pressure of measuring fluid, it is aimed to measure the pressure.

Due to the above arrangement of the conventional pressure sensor, when using the strain gage formed on the silicon substrate, no satisfactory bonding strength can be secured between the cylindrical body and the silicon substrate on which the strain gage is formed, so that the pressure of the measuring fluid cannot be applied directly onto the silicon substrate to measure the pressure of the measuring fluid. Therefore, it was necessary that the pressure act onto a buffering agent in a different chamber by using the diaphragm that is deformed by the measuring fluid whereupon the pressure of the buffering agent is measured by using the strain gage on the silicon substrate.

When using the strain gage of silicon thin film formed on the metallic diaphragm, it was not easy to directly form the strain gage of silicon thin film on the metallic diaphragm for receiving pressure through mass production in a lump sum since devices for silicon substrates (for silicon processing) could not be concurrently used.

Moreover, in a pressure sensor of capacity detecting type, an insulating layer needs to be formed on the metallic diaphragm and an electrode for capacity detection need to be formed thereafter through photolithographic techniques or the like. In this manner, when using a metallic diaphragm, the metallic diaphragm needs to undergo film forming or photolithographic processes so that film forming devices or photolithographic devices that are suitably used for silicon substrates cannot be used. Further, using a silicon substrate resulted in a complicated structure of the pressure sensor so that a drawback was presented that no pressure sensor of low cost and high reliability could be manufactured.

SUMMARY OF THE INVENTION

It is an object of the present invention to realize a simple thermal pressure sensor for solving the conventional problems. A thermal pressure sensor is arranged to thermally detect a displacement value of a diaphragm which receives pressure, wherein variations in heat quantities that are deprived in accordance with displacements of the diaphragm are obtained from a heating element of a detecting elements or a portion heated by the heating element which is remote from the diaphragm by a specified distance.

It is an object of the present invention to obtain a pressure sensor of high reliability and of low cost wherein measuring elements can be formed onto a silicon substrate through mass production in a lump sum by using conventional manufacturing techniques and devices which are applied to silicon substrates, wherein no processing of the metallic diaphragm is required while utilizing a metallic diaphragm formed on a cylindrical body as a pressure receiving body, and wherein no additional chamber for holding buffering agents is required since no external force is directly executed on the measuring element at the time of measuring pressure.

DISCLOSURE OF THE INVENTION

The pressure sensor of the present invention is arranged to be a pressure sensor comprising a diaphragm arrangement having a first surface which receives pressure and a thermal detecting portion disposed as to oppose a second surface of the diaphragm arrangement, wherein displacement values of the diaphragm owing to variations in pressure are thermally detected at the thermal detecting portion. With this arrangement, a surface of the diaphragm which receives pressure does not need to undergo film forming or photolithographic processes whereby main portions of thermal pressure detecting elements might be formed onto a silicon substrate by large quantities in a lump sum through simple manufacturing processes so that it is possible to improve accuracy and reliability of the thermal pressure detecting elements and to obtain a pressure sensor of low cost.

Since pressure is measured in a thermally non-contacting manner, external force is not directly executed on the thermal pressure detecting elements during measurement so that no bonding strength which endures pressure of measuring fluid needs to be maintained between the cylindrical body and the thermal pressure detecting elements, and it is enabled to achieve an easy arrangement and to obtain a pressure sensor of low cost.

Further, the pressure sensor is so arranged that the thermal detecting portion includes a heating means, and displacement values of the diaphragm are measured as amounts of variations in resistance values of the thermal detecting portion. With this arrangement, the heating portion itself is provided with a function of detecting temperature, and owing to the fact that the measuring circuit for measuring resistance values of the heating portion is simple, it is possible to obtain a pressure sensor of low cost.

Further, the thermal detecting portion includes a heating means which performs heating to a specified temperature, and displacement values of the diaphragm are measured as amounts of variations in current values of the thermal detecting portion. With this arrangement, the heating portion itself is provided with a function of detecting temperature, and by arranging a bridge circuit, current values for measurement might be accurately controlled so that it is possible to improve sensitivity of the thermal pressure detecting elements and to obtain a pressure sensor of low cost.

The thermal detecting portion disposed as to oppose the diaphragm is arranged to be smaller in size than the diaphragm. With this arrangement, the thermal detecting portion can be arranged to oppose a portion of the diaphragm which exhibits large displacements, and it is possible to obtain a pressure sensor of high sensitivity wherein amounts of variations in resistance, voltage and current due to pressure are large. Further, since the thermal detecting portion is small, it is possible to obtain a pressure sensor which power consumption is reduced.

Further, the thermal detecting potion includes a heating means, and further includes a temperature detecting portion adjacent to the heating means, and displacement values of the diaphragm are measured as amounts of variations in temperature of the temperature detecting portion. With this arrangement, it is possible to employ a detector of high sensitivity as the temperature-detecting portion and to obtain a pressure sensor of favorable sensitivity.

By further including a temperature compensating means for measuring and compensating an ambient temperature, it is possible to eliminate influences owing to variations in environmental temperature during usage by measuring the ambient temperature, and it is possible to obtain a pressure sensor of high reliability.

By further including a second temperature compensating means for measuring and compensating a temperature of the diaphragm, it is possible to eliminate influences owing to variations in environmental temperature during usage and in the temperature of the diaphragm by measuring the ambient temperature and the temperature of the diaphragm, and it is possible to obtain a pressure sensor of high reliability.

The arrangement further includes a second thermal detecting portion disposed as to oppose an end portion of the second surface of the diaphragm, that is, a second thermal detecting portion is disosed at outside portion of the diaphragm which is not displaced owing to pressure to achieve a reference output which is not varied owing to pressure. With this arrangement, it is possible to eliminate in-phase noise components by obtaining differences between the reference outputs and signal outputs, and it is possible to obtain a pressure sensor of low cost and of high reliability. Further, the provision of the second thermal detecting potion enables it to measure a temperature of the diaphragm to eliminate influences owing to variations in environmental temperature during usage and in temperature of the diaphragm, and it is possible to obtain a pressure sensor of high reliability.

By arranging a bridge circuit by means of the first thermal detecting portion and the second thermal detecting portion, it is made possible to perform signal processing through a simple circuit, and it is possible to obtain a pressure sensor of high reliability.

The pressure sensor according to the present invention is arranged to be a pressure sensor comprising a diaphragm arrangement having a first surface receiving pressure with a thermal detecting portion being formed in a concave portion of a substrate such that a diaphragm and the thermal detecting portion are disposed as to oppose each other through the concave portion of the substrate, and a thermal detecting portion disposed as to oppose a second surface of the diaphragm arrangement, wherein displacement values in the diaphragm owing to changes in pressure are thermally detected by the thermal detecting portion. With this arrangement, a distance between the diaphragm which serves as a pressure receiving surface and a thermal detecting element can be accurately controlled, and it is possible to obtain a pressure sensor of high reliability.

Further, spacers for regulating an opposing distance between the thermal detecting portion and the diaphragm are provided on the substrate on which the thermal detector portion is formed. With this is arrangement, spaces can be formed on a substrate in large quantities in a lump sum by using photolithographic techniques, and the distance between the diaphragm and the thermal detecting element can be accurately controlled so that it is possible to obtain a pressure sensor of high reliability.

The pressure sensor according to the present invention is so arranged that a second diaphragm arrangement which is disposed as to oppose the second surface of the first diaphragm and at least a part of which is supported on a silicon substrate is formed, and that a thermal detecting portion is arranged on the second diaphragm. With this arrangement, a diaphragm formed of heat-insulating supporting film of which strength is sufficiently maintained can be easily manufactured, and heat-insulating characteristics can be improved so that it is possible to obtain a pressure sensor of low power consumption and of superior sensitivity.

By arranging the heat-insulating supporting film which supports a heating portion as a bridge like arrangement, it is possible to obtain an arrangement of even more superior heat-insulating characteristics, of low power consumption, and of improved sensitivity, and owing to the bridge arrangement, no displacements occur in a thermal pressure detecting element portion since pressure acting on both ends thereof are identical, and it is possible to obtain a pressure sensor having outputs of favorable linear formation characteristics.

A void is formed on a side of the second surface of the silicon substrate, and a length of the void from the second diaphragm surface in the normal direction is set to be larger than a distance between the second diaphragm and the diaphragm receiving the pressure, whereby heat flow components flowing in a direction of the void can be restricted to thereby decrease the amount of consumed electric power.

Since the pressure sensor according to the present invention is further provided with a protecting portion covering the thermal detecting portion, reliability thereof can be further improved, and since a pressure of an interior of the protecting portion is set to be at atmospheric pressure or higher than atmospheric pressure, the sensitivity of the pressure detecting element can be continuously maintained to be constant and heat from the heating portion can be efficiently transmitted to the diaphram, and it is possible to obtain a pressure sensor of high reliability.

BEST MODE FOR CARRYING OUT THE INVENTION

Embodiments of the present invention will now be explained based on the drawings.

Embodiment 1

Figure 1:
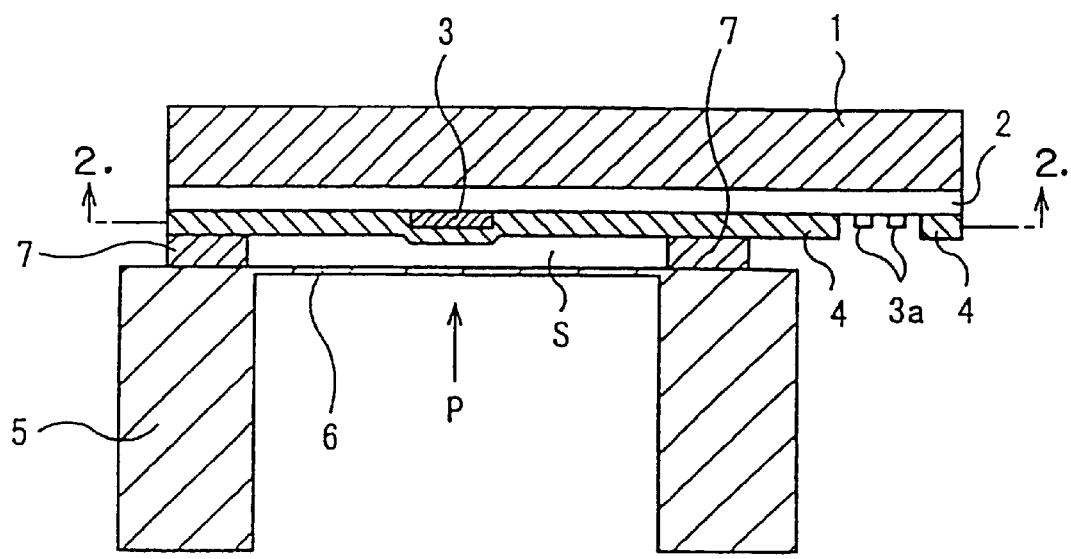
FIG. 1 is a schematic sectional view of a pressure sensor according to a first embodiment of the present invention.
Figure 2:
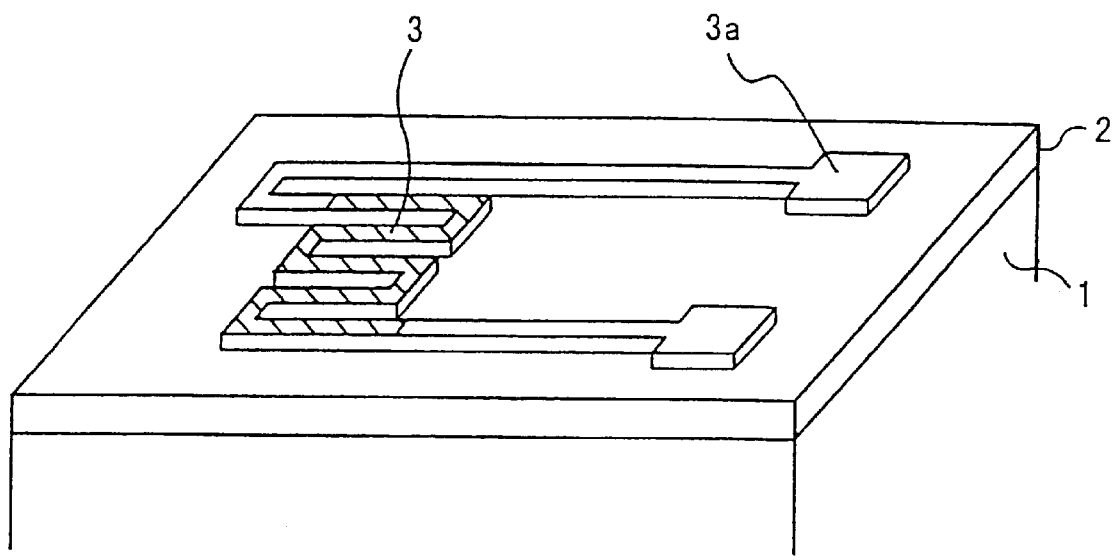
FIG. 2 is a partial perspective view seen from the direction A—A in FIG.1.

FIG. 1 and FIG. 2 are views for explaining a pressure sensor according to the present invention wherein FIG. 1 is a schematic sectional view and FIG. 2 a cross view seen from the direction A—A in FIG. 1 representing main portions of pressure detecting element of the pressure sensor. In the drawings, numeral 2 denotes a heat-insulating type supporting film made, for instance, of silicon nitride formed on one surface of a plate-like base material 1 composed, for instance, of silicon wafer, onto which a heat sensitive resistor film 3 is formed. This heat sensitive resistor film corresponds to a heating portion which is used as an exothermic resistance, temperature-measuring resistance or comparative resistance and might, for instance, be formed of platinum. A protecting film 4 is formed as to cover a measuring portion of the heat sensitive resistor film. On the other hand, a diaphragm 6 for receiving pressure is formed on a cylindrical body 5, and spacers 7 are arranged such that the diaphragm 6 and the measuring portion of the heat sensitive resistor film 3 are disposed as to oppose each other at a specified distance. It should be noted that 3a denotes a pad portion serving as a pick-out outlet for wiring to the heat sensitive resistor film 3.

Actions will be briefly explained. The heat sensitive resistor film 3 is electrically communicated by means of an input of an external power source and is generating heat. When an interior of the cylindrical body 5 receives a pressure P through the fluid, flows of heat in S of FIG. 1 are varied in accordance with displacements in the diaphragm 6. Therefore, by measuring amounts of variations in temperature, variations in resistance, and variations in current values of the heat sensitive resistor film 3, displacement values in the diaphragm which received pressure, that is, pressure of the object to be measured might be detected. In other words, the heat sensitive resistor film serves as a thermal detecting portion.

Manufacturing method of main portions of a pressure detector element as shown in FIG. 2 will now be explained. A silicon nitride film 2 having a thickness of approximately 1 µm is formed onto a silicon wafer 1 which is a plate-like base material of a thickness of approximately 400 µm through spattering or the like, and a heat sensitive resistor film 3 of platinum or the like of a thickness of approximately 0.2 µm is formed thereon through vapor deposition or spattering. Thereafter, annealing is performed for several hours at approximately 600° C. for stabilization. Patterning of this platinum film 3 is performed through a photolithographic, wet etching or dry etching methods to thereby form a current path having a pattern as shown in FIG. 2. A silicon nitride film having a thickness of approximately 0.8 µm is formed onto the platinum film 3 or the silicon nitride film 2 through methods such as spattering to form a protecting film 4 (not shown in FIG. 2).

As explained above, the pressure sensor of the present invention is so arranged that the pressure detecting element portion is formed onto the silicon substrate through film forming or photolithographic techniques using so-called silicon technology, that a detecting element portion is not directly formed on the diaphragm 6 provided on the cylindrical body 5, and that the pressure detecting element portion and the cylindrical body 6 are connected with spacers being interposed therebetween, whereby the following effects might be exhibited. That is, thermal pressure detecting elements formed on the silicon substrate through mass production in a lump sum are highly reliable and might be obtained at low cost. Since no external force is executed on the thermal pressure detecting elements during measurement of pressure, no strong bonding strength is required between the thermal pressure detecting elements and the diaphragm so that an arrangement of the pressure sensor can be made simple.

Materials or thicknesses of the respective films which constitute main portions of the pressure detecting elements in the above embodiment are not limited to the above-described ones. The thickness of silicon as the base material is not limited to 400 µm. The supporting film 2 and protecting film 4 might also be formed of silicon oxide film and thicknesses thereof might be in the range of 0.3 to 4 µm. Since the heat sensitive resistor film 3 is a platinum film in the above-described example, it is possible to obtain a pressure sensor of high reliability and superior sensitivity owing to superior corrosion-resistance while simultaneously having a large coefficient of variation of resistance temperature. However, a material of the heat sensitive resistor film is also not limited to platinum and might alternatively formed, for example, by spattering or vapor depositing a film composed of a Ni-group alloy or Ni having a thickness of 0.2 µm. When forming the heat sensitive resistor film 3 of Ni-group alloy or of Ni, it is possible to obtain a pressure sensor of superior sensitivity at low cost owing to low cost materials while simultaneously having a large coefficient of variation of resistance temperature. It is also possible to employ Co, Mo or alloys thereof, and the thickness thereof might be in the range of 0.1 to 1 µm.

It is possible to form the diaphragm 6 of SUS (stainless steel) and to uniformly form the diaphragm 6 with the cylindrical body 5 or to adhere the diaphragm 6 to the cylindrical body 5 through welding or the like in the above embodiment, whereby it is possible to obtain a pressure sensor of superior reliability owing to superior corrosion-resistance as well as superior mechanical characteristics.

Embodiment 2

Figure 3:
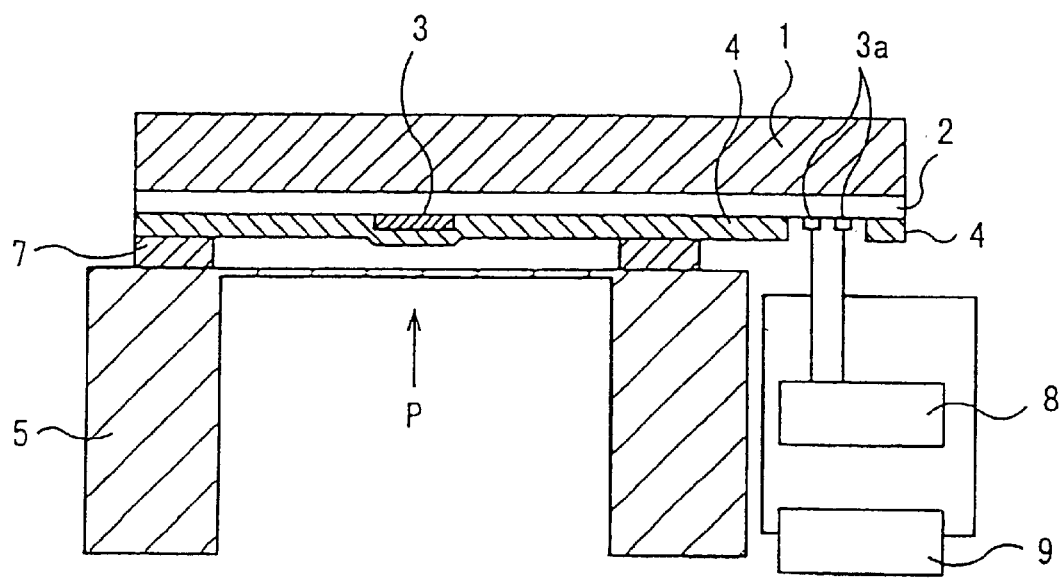
FIG. 3 is a schematic sectional view of a pressure sensor according to a second embodiment of the present invention.

Another embodiment of the present invention will now be explained with reference to the drawings. FIG. 3 is a view showing a structure of a pressure sensor according to Embodiment 2 of the present invention which is for explaining a measuring circuit connected to main portions of the pressure sensor. In the drawing, main portions of the sensor are identical to those as explained in connection with FIG. 1 relating to Embodiment 1. That is, in the drawings, numeral 2 denotes a heat-insulating type supporting film made, for instance, of silicon nitride formed on one surface of a plate-like base material 1 composed, for instance, of silicon wafer, onto which a heat sensitive resistor film 3 is formed as a thermal detecting portion. This heat sensitive resistor film corresponds to a heating portion which is used as an exothermic resistance, temperature-measuring resistance or comparative resistance and might, for instance, be formed of platinum. A protecting film 4 is formed as to cover a measuring portion of the heat sensitive resistor film. On the other hand, a diaphragm 6 for receiving pressure is formed on a cylindrical body 5, and the diaphragm 6 and the measuring portion of the heat sensitive resistor film 3 are connected to each other through spacers 7 as to oppose each other at a specified distance. A stationary current source 8 and the heat sensitive resistor is film 3 are connected to form a measuring system to which a constant current is conducted. In order to measure resistance values of the heat sensitive resistor film for pressure measurement, voltage on both ends of the heat sensitive resistor film is measured by means of a voltmeter 9.

Owing to the fact that the heating portion concurrently serves as the temperature detecting portion in the pressure sensor as shown in FIG. 3, the structure of thermal pressure detecting elements might be simplified, and since the measuring circuit might also be simplified by measuring resistance values of the heating portion, it is possible to obtain a pressure sensor of low cost.

Figure 4:
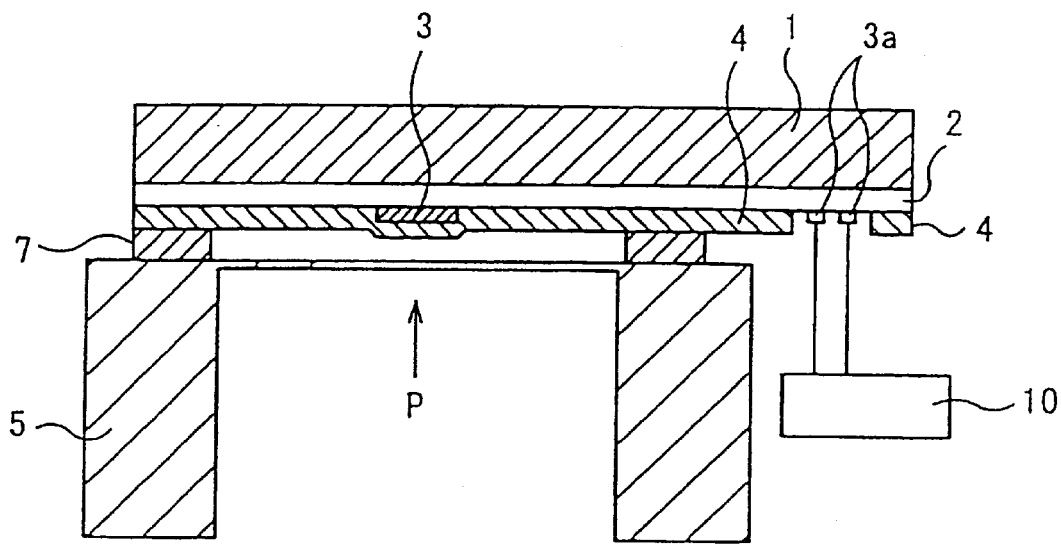
FIG. 4 is a schematic sectional view of another pressure sensor.

It should be noted that while the arrangement of FIG. 3 is so arranged that the stationary current source 8 is connected to the heat sensitive resistor film 3 and that the voltage on both ends of the heat sensitive resistor film is measured by means of the voltmeter 9, it is further possible to arrange a bridge circuit using the heat sensitive resistor film 3 as a measuring system which is connected to the heat sensitive resistor film 3 and which is controlled and electrically conducted by means of a control circuit 10 to continuously maintain the heating element at a constant temperature. FIG. 4 is a view for explaining another pressure sensor of the present invention in which a control circuit 10 is connected to a heat sensitive resistor film 3 of a pressure sensor portion corresponding to that of FIG. 3. Owing to the fact that the heating portion concurrently serves as the temperature detecting portion, the structure of thermal pressure detecting elements might be simplified, and since current values might be controlled by arranging the bridge circuit, it is possible to improve sensitivity of the thermal pressure detecting elements and to obtain a pressure sensor of low cost.

Similarly to Embodiment 1, a material of the heat sensitive resistor film is not limited to platinum in the above Embodiment 2 and might be formed of Ni, Co, Mo or alloys thereof to assume a thickness in the range of 0.1 to 1 $\mu$m. As for materials or thickness of the supporting film 2 and the protecting film 4, the silicon nitride film might also be replaced by silicon oxide film, and the thickness might be in the range of 0.3 to 4 $\mu$m, similarly to Embodiment 1. The diaphragm 6 might be of SUS and might be uniformly formed with the cylindrical body 5, or the diaphragm 6 might also be formed by adhering the same to the cylindrical body 5 through welding or the like.

Embodiment 3

While pressure was measured in the above Embodiments 1, 2 by measuring variations in resistance (or variations in current values) of the heat sensitive resistor film itself of the thermal pressure detecting element, the present Embodiment 3 is so arranged that a temperature detector is disposed proximately to a heat-generating resistor film and that temperature differences of the heat-generating resistor film generated through pressure are measured by the proximate temperature detector.

Figure 5:
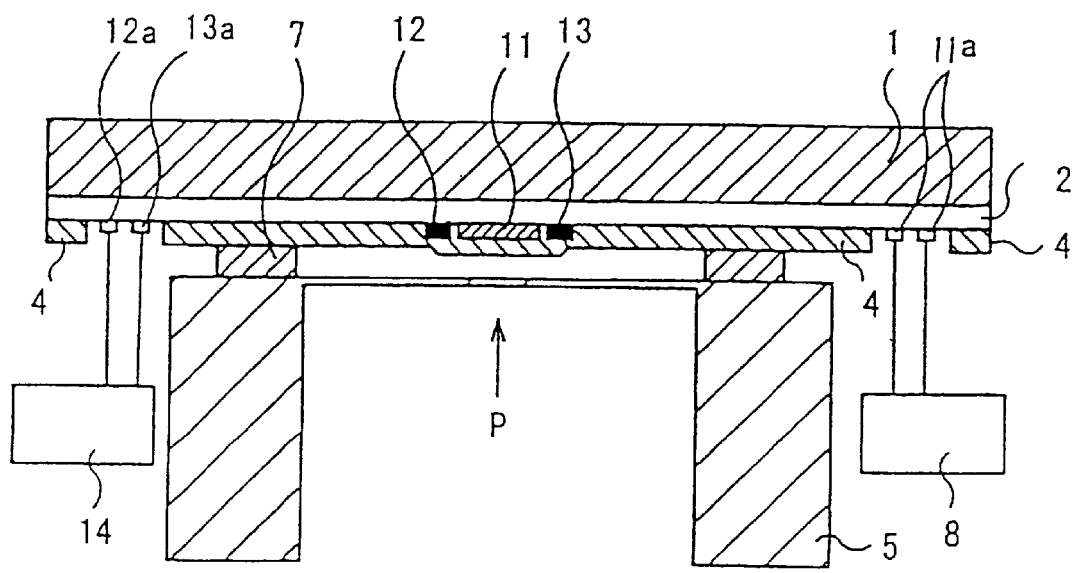
FIG. 5 is a schematic sectional view of a pressure sensor according to a third embodiment of the present invention.

One embodiment of the present invention will now be explained with reference to the drawings. FIG. 5 is a view showing an arrangement of a pressure sensor according to Embodiment 3 of the present invention wherein a film 11 of heat-generating resistor is disposed instead of the heat sensitive resistor film 3 of thermal pressure detecting element of Embodiments 1, 2, and two temperature detectors 12, 13 are arranged on both sides thereof proximately. It will be given an example in which the temperature detectors 12, 13 are thermocouples. The heat-generating resistor 11 is connected to a stationary current source 8 via a pad portion 11a of the heat-generating resistor 11, through which a constant current is conducted. For pressure measurement, variations in temperature of the heat-generating resistor 11 are measured through electromotive force of the temperature-measuring thermocouples 12, 13 which are provided proximately to the heat-generating resistor 11 and measured by means of a voltmeter 14 connected by means of respective pad portions 12a, 13a of the thermocouples 12, 13.

As indicated in the above Embodiments 1, 2, a silicon nitride film having a thickness of approximately 1 $\mu$m is formed on a plate-like base material composed, for instance, of a silicon wafer 1 having a thickness of approximately 400 $\mu$m through methods such as spattering. Then, polycrystalline silicon of a thickness of 0.7 $\mu$m is formed thereon as a conductive body on one side of the heat-generating resistor 11 and the temperature-measuring thermocouples through CVD or spattering methods, undergoes annealing and is thereafter patterned using photolithographic, wet etching or dry etching methods. In this manner, a current path and one of a pair of thermocouples are formed. In order to form the other of the thermocouples, an aluminum film is formed through methods such as spattering to assume a thickness of 0.7 $\mu$m. The formed aluminum film is patterned through photolithographic, wet etching or dry etching methods, formed to partially contact the polycrystalline silicon and further formed such that this point of contact is disposed proximately to the heat-generating resistor. Further, a heat-insulating protecting film 4 of silicon nitride film having a thickness of approximately 0.8 $\mu$m is formed onto the heat-generating resistor 11, temperature-measuring thermocouples 12, 13 and the supporting film 2 through spattering or the like.

While polycrystalline silicon is exemplarily used as the heat-generating resistor in the above Embodiment 3, it is also possible to employ platinum, Ni, Co, Mo or alloys thereof, similar to the materials for the heat sensitive resistor film of Embodiment 1. Especially, since the heat-generating resistor film does not need to have a large coefficient of variation of resistance temperature in Embodiment 3, it is possible to employ a conductive body film as the heat-generating resistor film such as polycrystalline silicon film, W or Al which are used in ordinary LSI processes. With this arrangement, materials might be selected among a large variety, and it is possible to utilize a material with optimal performances which might be easily manufactured in accordance with applications of the sensor.

While temperature detectors comprising thermocouples are disposed on both sides of the heat-generating resistor in the illustrated embodiment of FIG. 5, output voltage can be increased by providing a plurality of thermocouples on both sides. It is further possible to arrange a pair or a plurality of thermocouples on one side of the heat-generating resistor, or to provide a plurality of these to surround three or four directions in the periphery of the heat-generating resistor. The temperature detector might also be a heat sensitive resistor film similarly to that of Embodiment 1. In this case, the heat sensitive resistor film might be disposed on either or both sides or at any peripheral point as long as it is proximate to the heat-generating resistor.

As for materials or thickness of the supporting film 2 or the protecting film 4, the silicon nitride film might be replaced with silicon oxide film and the thickness might be in the range of 0.3 to 4 $\mu$m, similarly to Embodiment 1.

The variety for selection of materials for the heat-generating film is largely expanded in the pressure sensor according to the present embodiment so that it is possible to use a material of optimal performance. It is further possible to perform pressure measurement through electromotive force of thermocouples and to obtain a simple pressure sensor of low cost. By providing a plurality of thermocouples as temperature detectors, it is possible to obtain an output voltage which is proportional to the number of thermocouples whereby there can be obtained a pressure sensor of even more improved sensitivity.

Embodiment 4

Figure 6A:
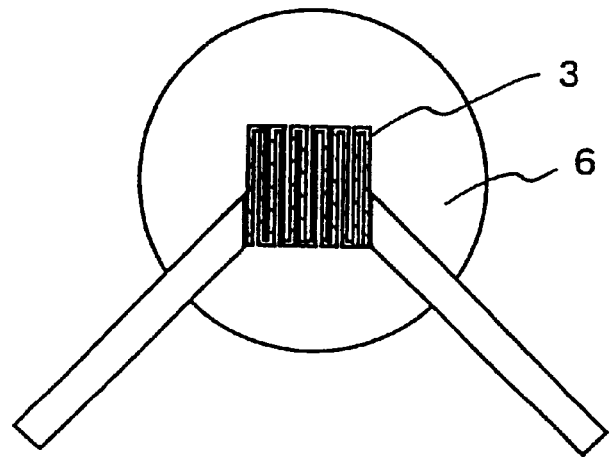
FIG. 6 is a schematic view of a part of a pressure sensor according to a fourth embodiment of the present invention wherein (a) indicates a dispositional relationship in which a thermal detecting portion is smaller than a diameter of a diaphragm, and (b) in which the thermal detecting portion is larger than the diameter of the diaphragm.
Figure 6B:
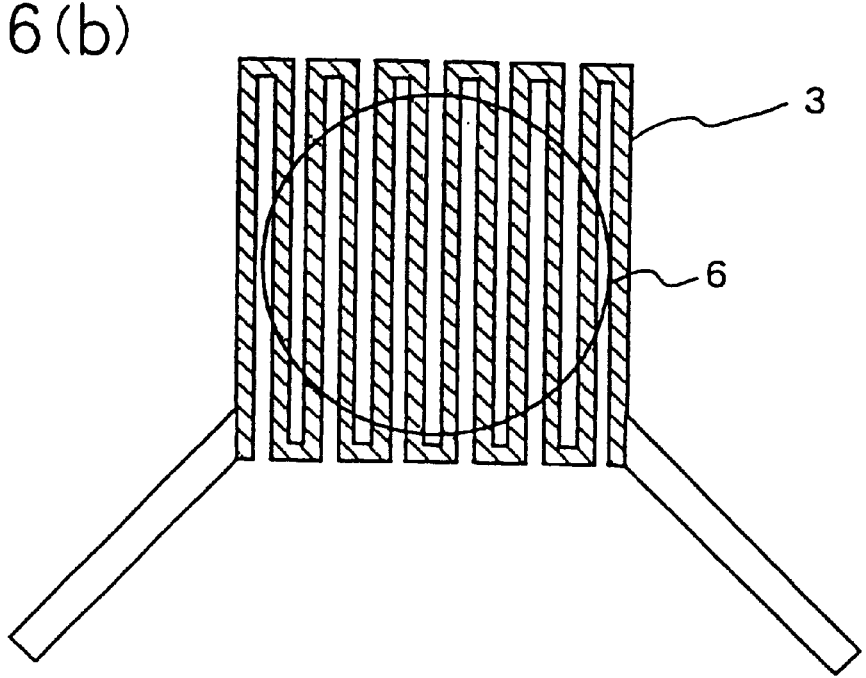
Figure 7:
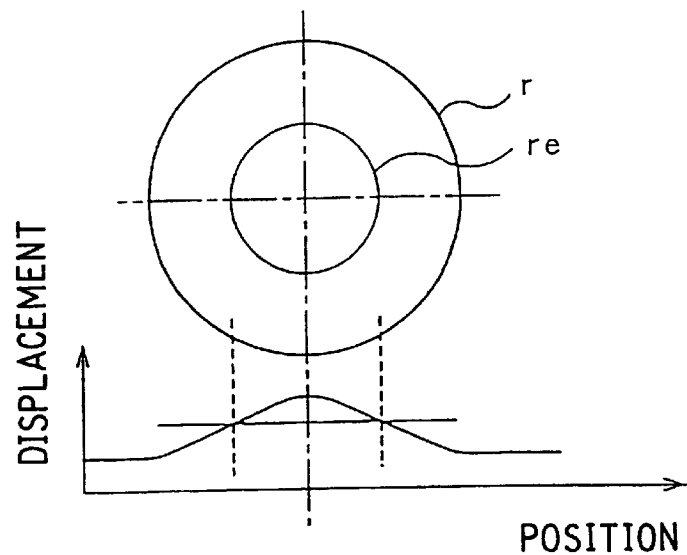
FIG. 7 is a view representing displacement values owing to variations in pressure by means of radial directional distribution of the diaphragm.

One embodiment of the present invention will now be explained with reference to the drawings. FIG. 6 is a view comparing a case in which an area of a heat sensitive resistor portion is smaller than an area of a diaphragm which receives pressure (a) and in which the area of the heat sensitive resistor is larger (b). In the drawings, main portions of the sensor are identical to those explained in connection with FIG. 1 according to Embodiment 1. In the sensor of the present invention, the temperature, resistance, voltage or current of the heat sensitive resistor film 3 is varied owing to variations in the flow of heat in S of FIG. 1 in accordance with displacements of the diaphragm 6 upon receiving pressure of an object to be measured, whereby the pressure of the object to be measured is detected. In case the size of the heat sensitive portion is larger than that of the diaphragm as shown in FIG. 6(b), the heat sensitive portion opposing a central portion of the diaphragm is deprived of heat in accordance with displacements of the diaphragm owing to pressure while the flow of heat is not changed in the heat sensitive portion located outside of the diaphragm since no displacement is generated. Therefore, the heat sensitive portion located outside of a peripheral portion of the diaphragm exhibits no variation in resistance, voltage and current so that the pressure sensitivity which corresponds to amounts of variations in resistance, voltage and current of the entire heat sensitive resistor film is degraded. Moreover, since a portion which is non-sensitive with respect to pressure also consumes electric power through heat generation, the electric power consumption will also be increased. By setting the heat sensitive resistor portion to be smaller than the diaphragm as shown in FIG. 6(a), it is possible to improve the sensitivity and to reduce the electric power consumption. Displacements in the diaphragm owing to pressure are shown in FIG. 7 as a radial directional distribution of the diaphragm. As shown in FIG. 7, a smooth curve is formed with a maximum displacement being reached at a center while the displacement becomes zero at the periphery thereof. Therefore, the amount of variation is smaller at the peripheral portion of the diameter than compared to its center. When defining a diameter showing 50% of an amount of variation in the central displacement as an effective diameter re of the diaphragm, it is possible to improve the sensitivity and to reduce the electric power consumption by setting the heat sensitive portion to be smaller than the effective diameter re of the diaphragm. It should be noted that the diameter of the diaphragm is denoted by r in the drawings.

Further, since a center of the heat sensitive portion and a center of the diaphragm might be shifted in case of actual elements depending on assembling accuracy, it is necessary to achieve a design in which the heat sensitive resistor portion and the diaphragm are opposed within the effective diameter even in the presence of such a shift. That is, the heat sensitive resistor portion needs to be smaller than the effective diameter re of the diaphragm by an amount which is more than a maximum amount of shift depending on assembling accuracy.

Figure 8A:
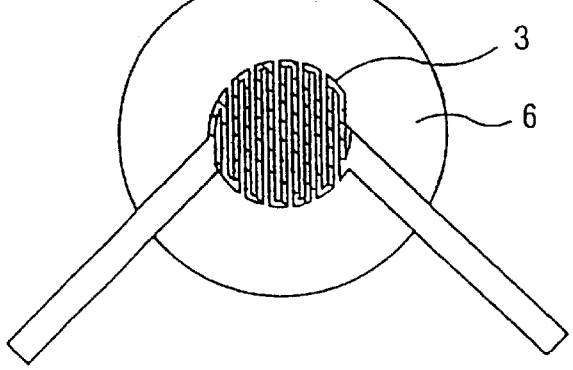
FIG. 8 is a view in which a calorific distribution of the thermal detecting portion is formed to be substantially circular wherein (a) represents formation by means of a rectangular pattern and (b) by means of a spiral pattern.
Figure 8B:
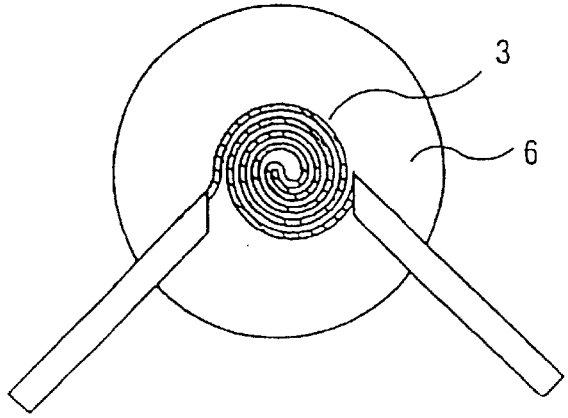

FIG. 8 is a view for explaining a case in which the heat sensitive resistor portion is so designed that the heat sensitive resistor 3 of FIG. 6 is further provided with a heat-generating means of which exothermic distribution is substantially circular, wherein (a)(b) indicate different patterns in which heat distributions are made to be substantially circular. In the drawings, main portions of the sensor are identical to those as described in connection with FIG. 2 according to Embodiment 1. Since the external shape of the heat sensitive resistor film 3 is circular as shown in FIG. 8, the temperature distribution at the time the resistor film is made to generate heat also becomes circular. Owing to the fact that a displacement contour of the diaphragm which receives pressure is also circular, displacements in the diaphragm might be converted into signals without losses by using a heat sensitive resistor film with a circular heat-generating temperature distribution, and it is possible to obtain a pressure sensor of high sensitivity and of low electric power consumption. Further, in case the heat sensitive resistor portion is square as shown in FIG. 2 or FIG. 6, the assembling tolerance is limited at four corners of the heat sensitive resistor portion in case of assembling the heat sensitive resistor portion such that it is completely within the effective diameter of the diaphragm. On the other hand, when a circular heat sensitive resistor portion having an area identical to that of the above square body is formed, the assembling tolerance is allowed to be larger owing to the circular shape similar to the effective region of the diaphragm, whereby making assembly easier.

Embodiment 5

Figure 9:
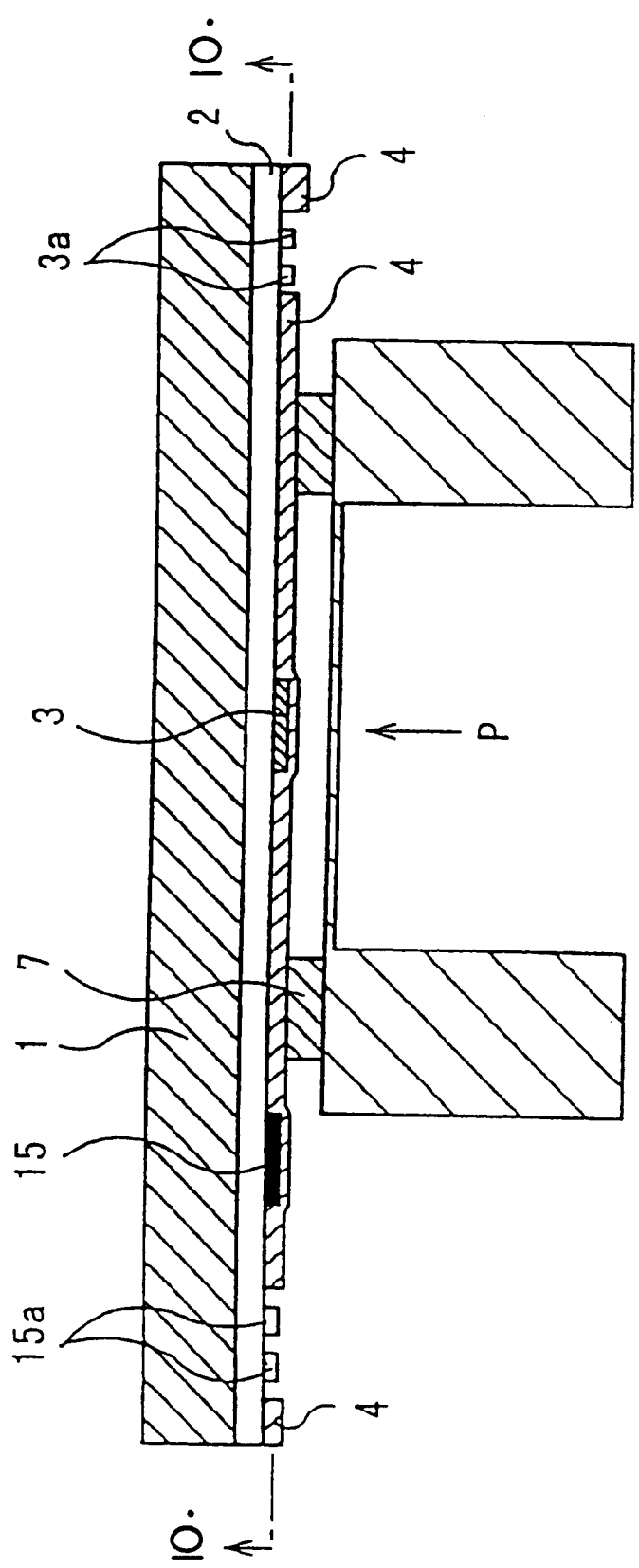
FIG. 9 is a schematic sectional view of a pressure sensor according to a fifth embodiment of the present invention.
Figure 10:
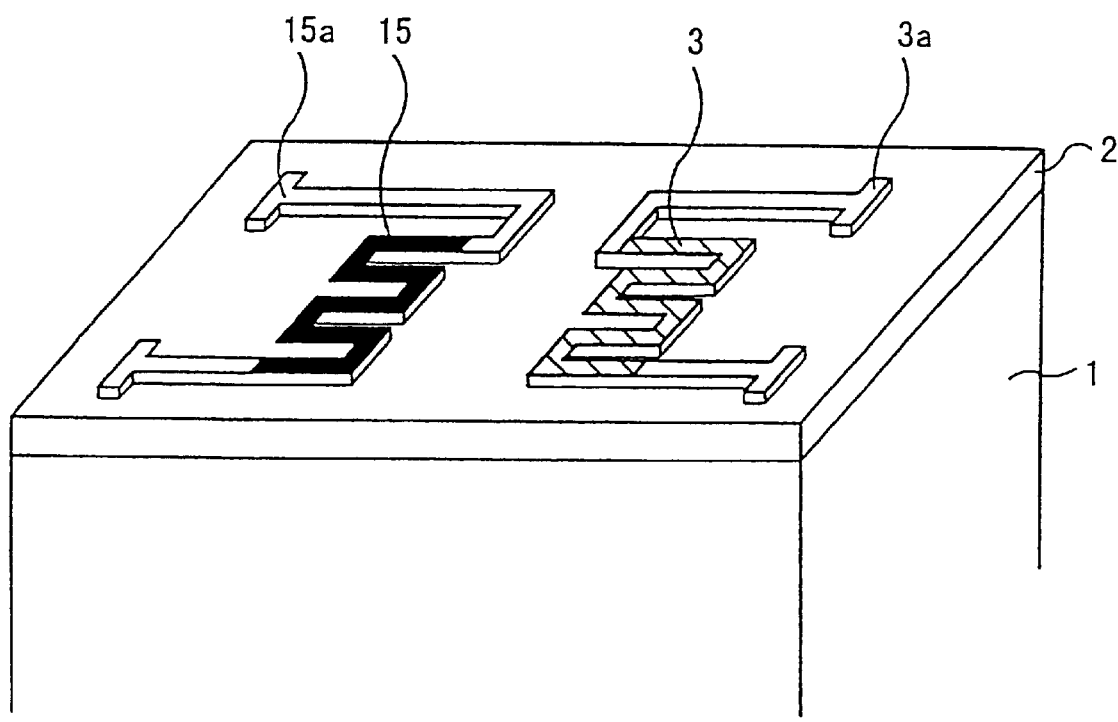
FIG. 10 is a partial perspective view seen from the direction B—B in FIG. 9.

Another embodiment of the present invention will now be explained with reference to the drawings. FIG. 9 is a view showing an arrangement of a pressure sensor according to Embodiment 5 of the present invention, which is a view for explaining an example in which correction of variations in environmental temperature during usage is enabled by measuring an ambient temperature of the pressure sensor. FIG. 10 is a cross view seen from direction B—B in FIG. 9 and represents main portions of a pressure detecting element of the pressure sensor. In each of the drawings, main portions of the sensor are identical to those explained in connection with FIG. 1 according to Embodiment 1 but is further formed with an ambient temperature detecting film 15. That is, numeral 2 in the drawing denotes a heat-insulating supporting film of, for instance, silicon nitride film, which is formed on one surface of a plate-like base material 1 comprising, for instance, silicon wafer, onto which there are formed a heat sensitive resistor film 3 and an ambient temperature detecting film 15 located sufficiently away from the heat sensitive resistor film 3. A protecting film 4 (though not shown in FIG. 10) is formed to cover measuring portions of the heat sensitive resistor film and the ambient temperature detector film. It should be noted that numeral 15a denotes a pad portion (pick-out outlet for wiring) of the ambient temperature detecting film.

While methods for pressure measurement are identical to those explained in Embodiment 1, due to the fact that influences owing to variations in environmental temperature of use might be eliminated by measuring the ambient temperature, it is possible to obtain a pressure sensor of low cost and of high reliability.

It should be noted that, similarly to Embodiment 1, the heat sensitive resistor film material in the above Embodiment 5 might be formed of platinum (Pt), Ni, Co, Mo or alloys thereof to assume a thickness in the range of 0.1 to 1 $\mu$m. As for materials or thicknesses of the supporting film 2 and the protecting film 4, the silicon nitride film might also be replaced by silicon oxide film, and the thickness might be in the range of 0.3 to 4 $\mu$m, similarly to Embodiment 1.

Embodiment 6

Figure 11:
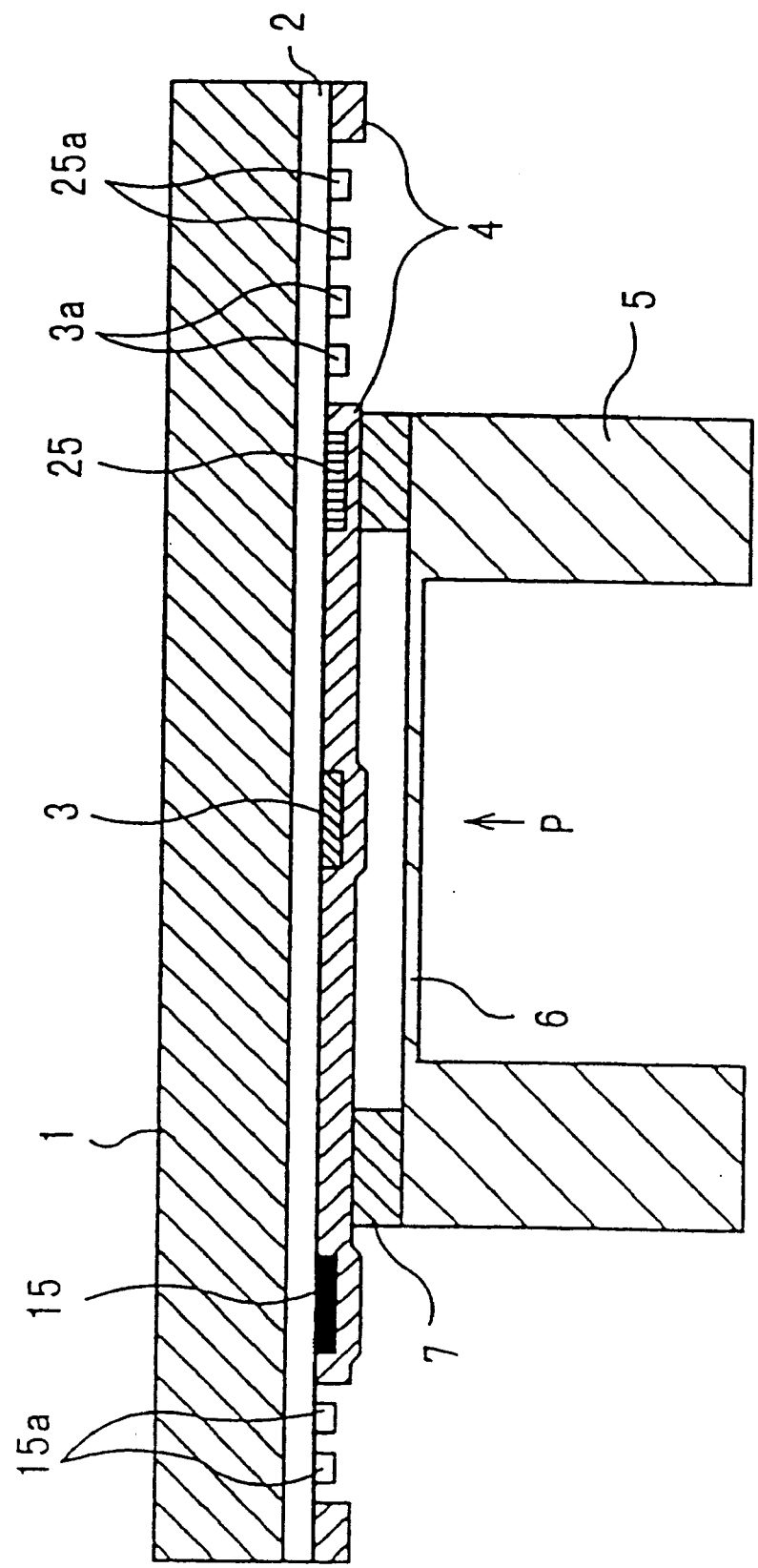
FIG. 11 is a schematic sectional view of a pressure sensor according to a sixth embodiment of the present invention.

Another embodiment of the present invention will now be explained with reference to the drawings. FIG. 11 is a view showing an arrangement of a pressure sensor according to Embodiment 6 of the present invention, which is a view for explaining an example in which correction of variations in environmental temperature during usage and variations in temperature of the diaphragm is enabled by measuring an ambient temperature of the pressure sensor as well as an temperature of the diaphragm receiving the pressure. While the main portions of the sensor are identical to those explained in connection with FIG. 1 according to Embodiment 1, there is formed a temperature detecting film 25 for measuring a temperature of the cylindrical body 5 and the diaphragm 6 in addition to the ambient temperature detecting film 15 shown in FIG. 9 according to Embodiment 5. That is, numeral 2 in the drawing denotes a heat-insulating supporting film of, for instance, silicon nitride film, which is formed on one surface of a plate-like base material 1 comprising, for instance, silicon wafer, onto which there are formed a heat sensitive resistor film 3, an ambient temperature detecting film 15 located sufficiently away from the heat sensitive resistor film 3, and a temperature detecting film 25 at a portion of spacers 7 for measuring temperatures of the cylindrical body 5 and the diaphragm 6. It should be noted that 25a denotes a pad portion (pick-out outlet for wiring) of the temperature detecting film 25.

While methods for pressure measurement are identical to those as explained in Embodiment 1, due to the fact that influences owing to variations in environmental temperature during usage or variations in temperature of the diaphragm might be eliminated by measuring the ambient temperature and the temperature of the diaphragm, it is possible to obtain a pressure sensor of low cost and of high reliability.

Embodiment 7

Figure 12:
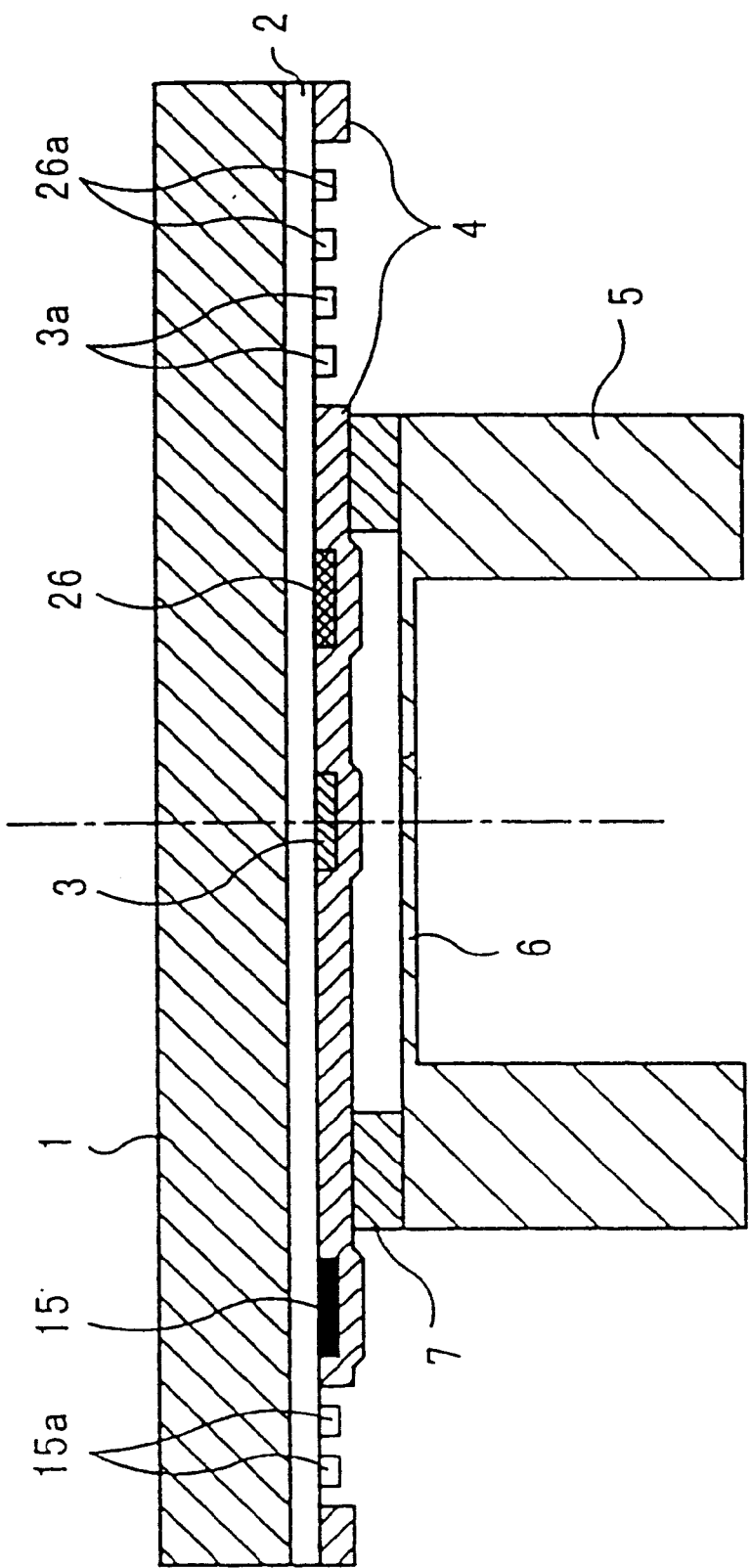
FIG. 12 is a schematic sectional view of a pressure sensor according to a seventh embodiment of the present invention.

Another embodiment of the present invention will now be explained based on the drawings. FIG. 12 is a view showing a structure of the pressure sensor according to Embodiment 7 of the present invention, which is a view for explaining an example in which elimination of noise components is enabled by providing separate reference outputs (comparative outputs) which are not varied through pressure. While the main portions of the sensor are identical to those explained in connection with FIG. 1 according to Embodiment 1, there is formed a second heat sensitive resistor portion 26 as to oppose an end portion of the diaphragm 6. That is, numeral 2 in the drawing denotes a heat-insulating supporting film of, for instance, silicon nitride film, which is formed on one surface of a plate-like base material 1 comprising, for instance, silicon wafer, onto which there are formed a heat sensitive resistor film 3 for signal outputs and a second heat sensitive resistor film 26 for reference outputs. While the heat sensitive resistor film 3 is disposed as to oppose the center of the diaphragm 6, the second heat sensitive resistor film 26 is disposed as to oppose a portion of the diaphragm 6 at an end portion thereof which is not displaced through pressure. It should be noted that 26a denotes a pad portion (pick-out outlet for wiring) of the second heat sensitive resistor film 26.

While methods for pressure measurement are identical to those explained in Embodiment 1, owing to the fact that, in the present embodiment, reference outputs which are not varied through pressure might be obtained through the second heat sensitive resistor film 26 in addition to pressure signals, it is possible to eliminate in-phase noise components by obtaining a difference of these and thus to obtain a pressure sensor of low cost and of high reliability.

At this time, in case the arrangement and shape of the second heat sensitive resistor portion 26 are made to be identical to those of the first heat sensitive resistor portion 3, it is enabled to take out only displacement signals owing to pressure based on differential outputs between these. At this time, in case a bridge circuit is formed as a signal processing circuit, it is possible to obtain a pressure sensor of even simpler arrangement and of high reliability.

It should be noted that, similarly to Embodiment 1, the heat sensitive resistor film material in the above embodiment might be formed of platinum, Ni, Co, Mo or alloys thereof to assume a thickness in the range of 0.1 to 1 $\mu$m. As for materials or thicknesses of the supporting film 2 and the protecting film 4, the silicon nitride film might also be replaced by silicon oxide film, and the thickness might be in the range of 0.3 to 4 $\mu$m, similarly to Embodiment 1.

Figure 13A:
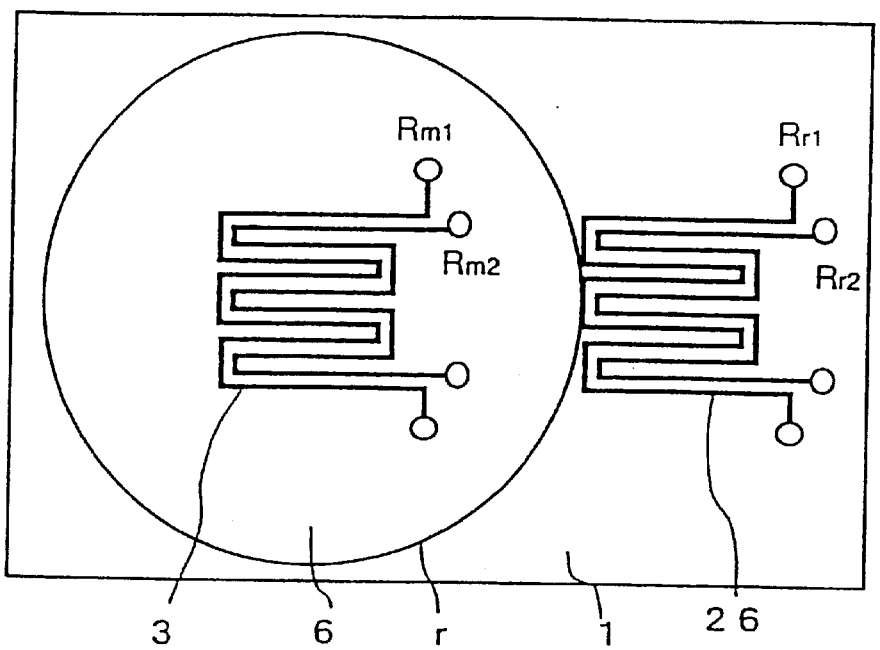
FIG. 13 is a view representing an example in which a signal processing circuit is arranged by using first and second thermal detecting portions of FIG. 12 wherein (a) is a schematic structural view of the thermal detecting portion and (b) a view showing an arrangement of a bridge circuit which is one example of a signal processing circuit.
Figure 13B:
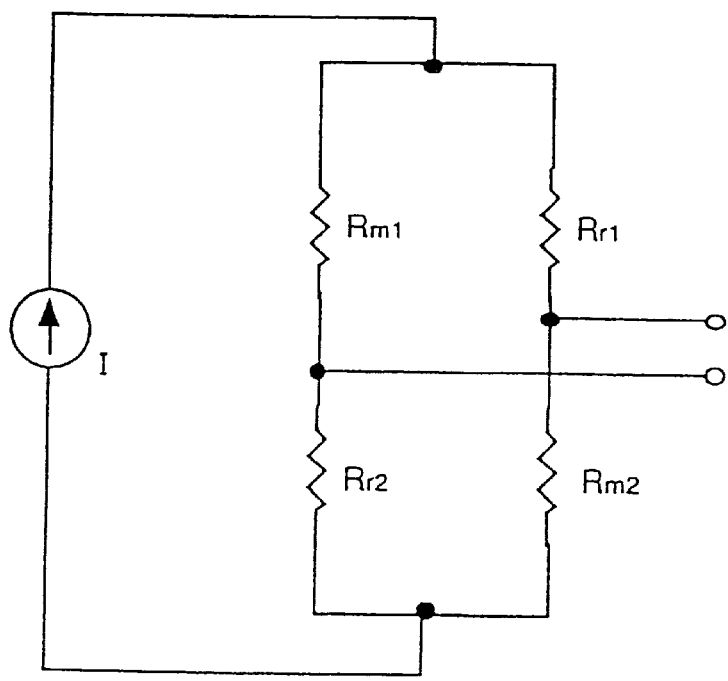

FIG. 13 is a view showing an example of a circuit arrangement for obtaining differential outputs. FIG. 13(a) is a schematic view of the elements of FIG. 12 seen from the top. As shown in FIG. 13(b), in order to form a bridge circuit by the first heat sensitive resistor portion 3 and the second heat sensitive resistor portion 26, two heat sensitive resistors (Rm1, Rm2, Rr1, Rr2) are respectively formed. Since differential outputs might be obtained through the bridge circuit indicated in FIG. 13(b), it is possible to eliminate offsets or in-phase noise components to thereby obtain a pressure sensor of low cost and of high reliability. In FIG. 13(a), while Rm1, Rm2 and Rr1, Rr2 are formed at identical locations with patterns shapes as illustrated in the drawing, the pattern shapes might be different from the illustrated ones. The location might also be varied; for instance, the Rm1 and Rm2 might be for med at symmetrical positions with respect to the center of the diaphragm 6 receiving the pressure, and Rr1, Rr2 might be formed at any position at the end portion of the diaphragm 6 as long as it is hardly displaced owing to pressure. Further, while the bridge circuit is formed of Rm1, Rm2 and Rr1, Rr2 in FIG. 13, it is also possible that either or both of the Rm2 and Rr2 be externally attached resistances, or that an external resistance be inserted into the bridge circuit in a serial or parallel manner. In this case, there is achieved an effect that adjustments might be performed through the external resistance.

Embodiment 8

While Embodiments 1 to 7 are so arranged that the pressure detecting element portion and the cylindrical body with the diaphragm are connected while maintaining a specified distance therebetween by means of spacers, the present embodiment arranged such that spacers are formed onto the silicon substrate through photolithographic techniques. It is thereby enabled to accurately form such spacers at desired portions of pressure detecting element portions through mass production in a lump sum, and there can be realized a pressure sensor of high reliability and low cost.

While the method for manufacturing main portions of the pressure detector elements is identical to that explained in Embodiment 1, the spacers are formed after forming the surface protecting film 4. In case the spacers are formed as an organic insulating film of polyimide resin or the like, the following steps are performed. First, a polyimide coating agent is uniformly applied onto the silicon substrate through means such as spin coating after forming the surface protecting film 4. Then, a photosensitive resist is applied, and polyimide resin is processed to assume a desired pattern through photolithographic techniques. By using a photosensitive polyimide coating agent, it is possible to directly form a pattern without the resist for further simplification. After processing the pattern, sintering is performed at a baking temperature of approximately 300° C. to obtain a polyimide resin. By using a polyimide coating agent in this manner, it is possible to accurately form spacers through simple steps.

In case of forming the spacers of a metallic thick film, the following steps are performed. After forming the surface protecting film 4, a photosensitive resist is applied to assume a thick film and a pattern is obtained through photolithographic techniques wherein a portion at which the spacers are formed is open. Then, a thick film of metal such as Au, Cu, Pb or Sn, alloys thereof, or lamination thereof is formed into the aperture of the resist through spattering or plating, and the resist film is removed thereafter to form spacers of metallic thick film. By using a metallic thick film, it is possible to accurately form spacers through simple processes. While the number of processes to be performed is increased in the case of metallic thick films than compared to polyimide resin, the thermal resistance between the pressure detecting element portion and the diaphragm can be decreased by using a metallic film as spacers, so that it is possible to obtain a merit of improving the measuring accuracy owing to decreased temperature differences between the pressure detecting element portion and the diaphragm. In case the elements and the package are electrically connected through a soldering bump, the soldering bump is formed on the pad of output terminals of the elements through screen printing or plating. By forming the soldering bump as spacers of metallic thick film also onto the spacer forming portion, it is enabled to simultaneously form spacers in the soldering bump forming process so that the number of process will not be increased through the spacers.

As explained so far, since spacers are formed on the substrate through ordinary wafer processes in the pressure sensor according to the present embodiment, the thickness or location of the spacers might be accurately formed so as to enable precise regulation of the distance between the diaphragm which serves as the pressure receiving surface and the thermal pressure detecting element. It is therefore enabled to realize a pressure sensor of simple arrangement and of low cost and further to obtain a pressure sensor of constant sensitivity and of high reliability.

Embodiment 9

While Embodiments 1 to 8 are so arranged that the pressure detecting element portion and the cylindrical body with the diaphragm are connected while maintaining a specified interval therebetween by means of spacers, the present embodiment arranged such that a clearance corresponding to the interval between the diagram and the detecting element portion is formed by arranging a concave portion in a plate-like base material to further simplifying its structure.

Figure 14:
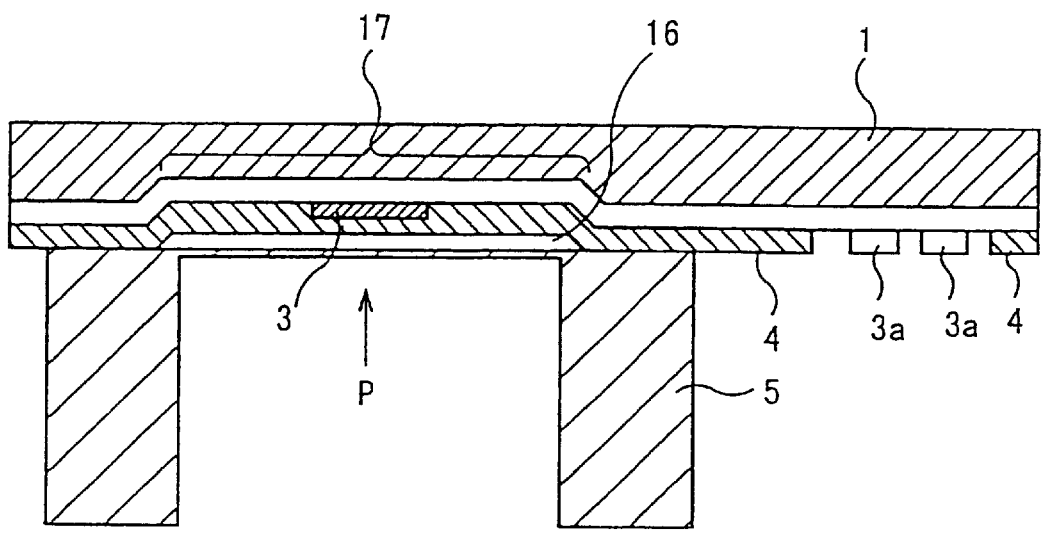
FIG. 14 is a schematic sectional view of a pressure sensor according to a ninth embodiment of the present invention.

One embodiment of the present invention will now be explained based on the drawings. FIG. 14 is a sectional view showing an arrangement of the pressure sensor according to Embodiment 5 of the present invention. In the drawing, a concave portion 17 is formed on a part of a plate-like base material 1 comprising, for instance, a silicon wafer, wherein a heat-insulating supporting film 2 of, for instance, silicon nitride film, is formed on a surface on which the concave portion is formed. Onto the supporting film 2 of the concave portion 17 on the base material 1, a heat sensitive resistor film 3 (made, for instance, of platinum) is formed as to provide a detecting portion (measuring portion), and a protecting film 4 is further formed thereon as to cover the measuring portion of this heat sensitive resistor film 3. On the other hand, a diaphragm 6 is formed on a cylindrical body 5 for receiving pressure from a measuring fluid wherein the diaphragm 6 and the measuring portion of the heat sensitive resistor film 3 are connected by being disposed as to oppose each other at a specified distance which corresponds to a depth of the concave portion 17 (caved portion 16).

Next, a method for manufacturing main portions of the pressure detecting element will be explained. A mask or the like is formed on the silicon wafer 1 having a thickness of approximately 400 μm which is a plate-like substrate, and an etching hole (concave portion 17) is formed through photolithographic methods or the like. By performing methods such as wet etching or dry etching, a part of the plate-like substrate 1 is removed to form the concave portion 17. For arranging the detecting portion (measuring portion) on the concave portion formed onto the plate-like base material 1, a silicon nitride film of a thickness of approximately 1 μm is formed through methods such asspattering, and a heat sensitive resistor film 3 made of e.g. platinum having a thickness of 0.2 μm is formed thereon through vapor deposition or spattering methods. The platinum film 3 undergoes annealing whereupon patterning is performed through wet etching or dry etching methods to thereby form a current path. A silicon nitride film of a thickness of approximately 0.8 μm is formed through methods such as spattering onto the patterned platinum film 3 or the silicon nitride film 2 as a protecting film 4.

As explained above, the pressure sensor of the present embodiment is so arranged that the thermal pressure detecting element is formed on the concave portion 17 formed on the substrate so that a distance between the diaphragm which serves as the pressure receiving surface and the thermal pressure detecting element can be precisely regulated by using the caved portion 16 provided by the concave portion 17. Thus, there can be realized a pressure sensor of simple arrangement and of low cost while it is further possible to obtain a pressure sensor of constant sensitivity and of high reliability.

It should be noted that the heat sensitive resistor film material is not limited to platinum also in the above Embodiment 9 similar to Embodiment 1, and it is possible to employ Ni, Co, Mo or alloys thereof and to assume a thickness in the range of 0.1 to 1 μm. As for materials or thickness of the supporting film 2 and the protecting film 4, the silicon nitride film might also be replaced by silicon oxide film, and the thickness might be in the range of 0.3 to 4 μm, similarly to Embodiment 1.

Embodiment 10

While the detecting portion (measuring portion) is formed on a bottom portion of the concave portion formed in the substrate 1 in the above Embodiment 9, the present embodiment is so arranged that the concave portion (cave) is formed on a surface opposite to the side of the base material 1 on which the detecting portion is formed for improving heat insulating characteristics of the detecting portion.

Figure 15:
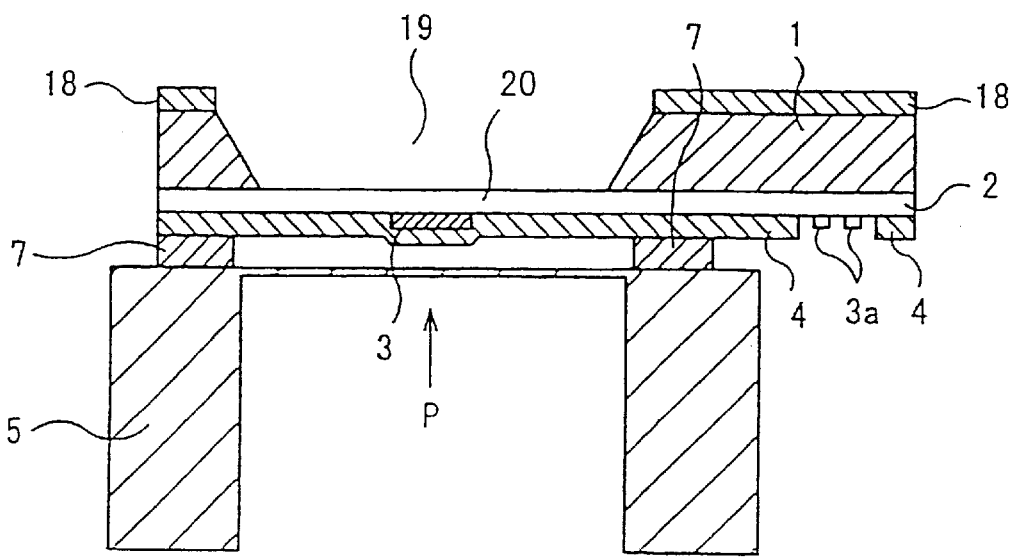
FIG. 15 is a schematic sectional view of a pressure sensor according to a tenth embodiment of the present invention.
Figure 16:
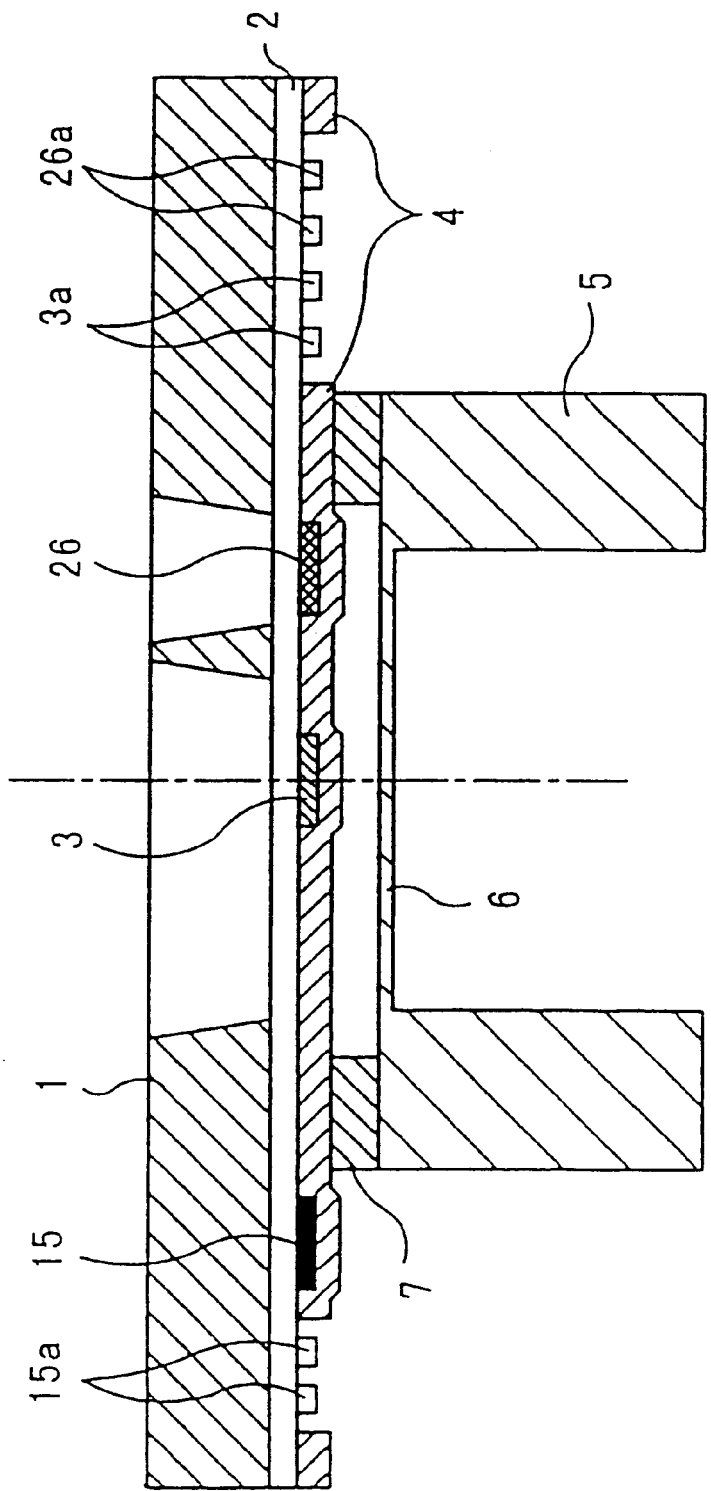
FIG. 16 is a schematic sectional view of another pressure sensor.

One embodiment of the present invention will now be explained with reference to the drawings. FIG. 15 is a sectional view showing an arrangement of the pressure sensor according to Embodiment 10 of the present invention. In the drawing, there are sequentially formed on to a plate-like base material 1 comprising, for instance, a silicon wafer, a heat-insulating supporting film 2 of, for instance, silicon nitride film, and a heat sensitive resistor film 3 (made, for instance, of platinum), and a protecting film 4 is formed as to cover the measuring portion of the heat sensitive resistor film 3. On the other hand, a diaphragm 6 for receiving pressure from a measuring fluid is formed on a cylindrical body 5, and this diaphragm 6 and the measuring portion of the heat sensitive resistor film 3 are connected with spacers 7 being interposed therebetween to be disposed as to oppose each other at a specified distance. A caved portion 19 is formed in a scooping-out manner from a surface opposite to that of the measuring portion of the base material 1 on which the heat sensitive resistor film 3 is formed, and the heat sensitive resistor film is formed onto a diaphragm 20 comprising the supporting film 2 where the base material 1 is scooped-out to form the concave portion 19.

A method for manufacturing main portions of the pressure detecting element will now be explained. A silicon nitride film of a thickness of approximately 1 μm is formed onto the silicon wafer 1 having a thickness of approximately 400 μm which is a plate-like base material through methods such as spattering, and a heat sensitive resistor film 3 having a thickness of approximately 0.2 μm of platinum or the like is further formed thereon through vapor deposition, spattering or the like. The platinum film 3 undergoes annealing whereupon patterning is performed through photolithographic, wet etching or dry etching methods to thereby form a current path. A silicon nitride film of a thickness of approximately 0.8 μm is formed through methods such as spattering onto the patterned platinum film 3 or the silicon nitride film 2 as a protecting film 4.

A protecting film 18 is further formed on a surface of the plate-like base material 1 opposite to the surface on which the supporting film 2 is formed, and is patterned in a desired manner through photolithographic methods or the like. By performing alkali etching or the like, a part of the plate-like base material 1 is removed to thereby form a caved portion 19 such that a diaphragm 20 is formed on the supporting film 2 of the measuring portion where the base material 1 has been removed.

As explained so far, owing to the facts that the processes for manufacturing the diaphragm 20 of the heat-insulating supporting film are simple, that the strength of the diaphragm might be maintained sufficiently strong, and that the heating element is formed on the diaphragm, it is possible to improve heat-insulating characteristics whereby it is possible to obtain a pressure sensor of low electric power consumption and of superior sensitivity.

In the above embodiment, by forming the second heat sensitive resistor portion 26 as explained in connection with Embodiment 7 at an end portion of the diaphragm in a corresponding manner, it is possible to obtain, in addition to pressure signals, reference outputs from the second heat sensitive resistor film 26 which are not varied through pressure, and by obtaining a difference of these, it is possible to eliminate in-phase noise components to thereby obtain a pressure sensor of low cost and of high reliability. Further, by forming a bridge circuit similarly to Embodiment 7 as a signal processing circuit, it is possible to obtain a pressure sensor of further simplified arrangement and of high reliability.

Further, since the first heat sensitive resistor portion and the second heat sensitive resistor portion are thermally separated from the silicon substrate in the present embodiment, their temperatures are determined by displacement values of the diaphragm 6 receiving the pressure and the temperature thereof. Therefore, it is possible to measure temperature variations of the diaphragm from outputs of the second heat sensitive resistor portion which is not varied through pressure to thereby eliminate influences owing to variations in the temperature of the diaphragm.

It should be noted that similarly to Embodiment 1, material for the heat sensitive resistor film is not limited to platinum also in the above Embodiment 10 and it might be formed of Ni, Co, Mo or alloys thereof to assume a thickness in the range of 0.1 to 1 μm. As for materials or thicknesses of the supporting film 2 and the protecting film 4, the silicon nitride film might also be replaced by silicon oxide film, and the thickness might be in the range of 0.3 to 4 μm. The arrangement of the present embodiment is further adjusted such that a tensile stress is generated in a synthetic manner within the three layers of the supporting film, resistor film and the protecting film or the two layers of the supporting film and the protecting film.

Embodiment 11

While a concave portion (cave) is formed from a surface opposite to the side of the base material 1 on which the detecting portion is formed in the above Embodiment 10 for improving heat-insulating characteristics of the detector portion, the present Embodiment 11 shows an example of an arrangement in which the heat-insulating characteristics are further improved.

Figure 17:
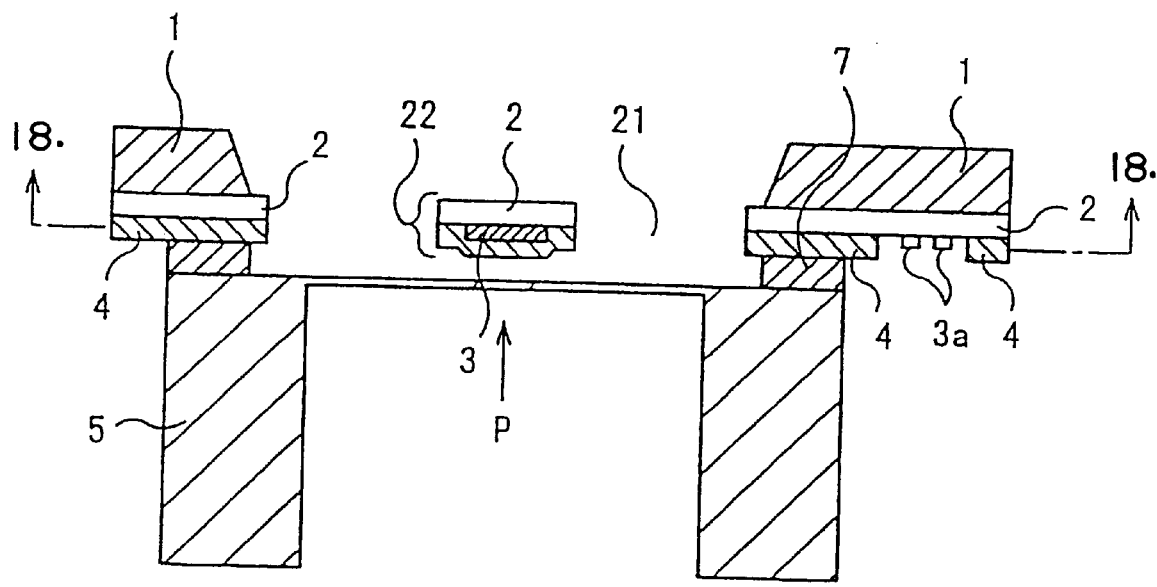
FIG. 17 is a schematic sectional view of a pressure sensor according to an eleventh embodiment of the present invention.
Figure 18:
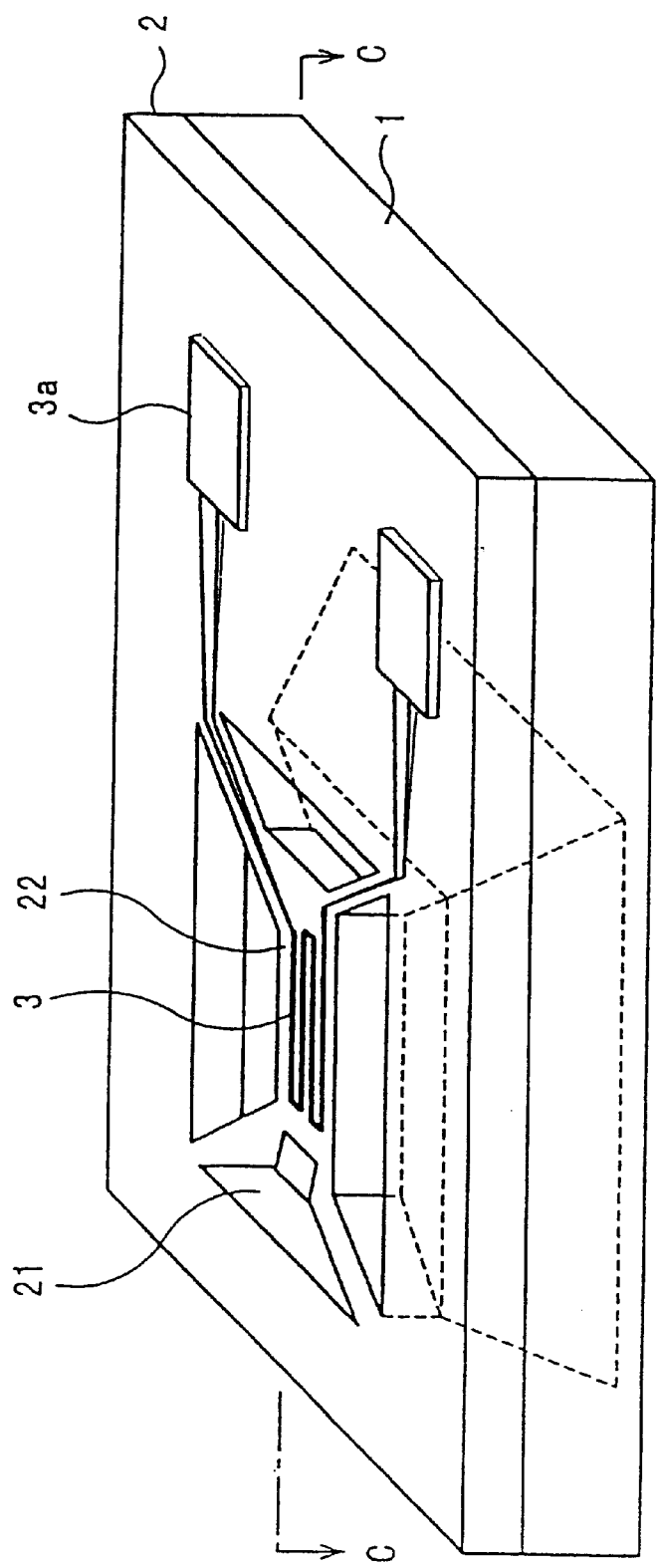
FIG. 18 is a partial perspective view seen from the direction C—C in FIG. 17.

One embodiment of the present invention will now be explained with reference to the drawings. FIG. 17 is a sectional view showing an arrangement of the pressure sensor according to Embodiment 11 of the present invention, and FIG. 18 is a perspective view seen from direction C—C in FIG. 17. In the drawings, there are sequentially formed onto a plate-like base material 1 comprising, for instance, a silicon wafer, a heat-insulating supporting film 2 of, for instance, silicon nitride film, and a heat sensitive resistor film 3 (made, for instance, of platinum), and a protecting film 4 is formed as to cover the measuring portion of the heat sensitive resistor film 3. On the other hand, a diaphragm 6 for receiving pressure from measuring fluid is formed on a cylindrical body 5, and this diaphragm 6 and the measuring portion of the heat sensitive resistor film 3 are connected with spacers 7 being interposed therebetween to be disposed as to oppose each other at a specified distance. A caved portion is formed in a scooping-out manner from a surface opposite to that of the measuring portion of the base material 1 on which the heat sensitive resistor film 3 is formed, and the heat sensitive resistor film is formed onto a diaphragm comprising the supporting film 2 where the base material 1 is scooped-out. The measuring portion of the heat sensitive resistor film 3 is heat-insulated from its peripheral portion through an etching hole 21 and forms a bridge arrangement 22 as shown in FIG. 17, being supported in the air through the bridge.

Methods for manufacturing main portions of the pressure detecting element will now be explained. A silicon nitride film of a thickness of approximately 1 μm is formed onto the silicon wafer 1 having a thickness of approximately 400 μm which is a plate-like base material through spattering or the like, and a heat sensitive resistor film having a thickness of approximately 0.2 μm of platinum or the like is further formed thereon through vapor deposition, spattering or the like. The platinum film 3 undergoes annealing whereupon patterning is performed through photolithographic, wet etching or dry etching methods to thereby form a current path. A silicon nitride film of a thickness of approximately 0.8 μm is formed through methods such as spattering onto the patterned platinum film 3 or the silicon nitride film 2 as a protecting film 4. An etching hole 21 is formed through photolithographic techniques or the like on a surface of the plate-like base material 1 on which the supporting film 2 is disposed.

A protecting film 18 is further formed on a surface of the plate-like base material 1 opposite to the surface on which the supporting film 2 is formed, and is patterned in a desired manner through photolithographic methods or the like. By performing alkali etching or the like, a part of the plate-like base material 1 is removed to thereby form a caved portion, and the caved portion is connected to the etching hole 21 such that heat insulation of the bridge portion 22 with respect to its periphery is achieved. Further, the measuring portion where the base mterial 1 has been removed is formed on the diaphragm comprising the supporting film 2.

As explained so far, since the heat-insulating supporting film is formed to assume a bridge-like shape in the pressure sensor of the present embodiment, it is possible to improve the heat-insulating characteristics of the measuring portion so that there can be obtained a pressure sensor of low electric consumption and of superior sensitivity.

It should be noted that similarly to Embodiment 1, material for the heat sensitive resistor film is not limited to platinum also in the above Embodiment 11 and might be formed of Ni, Co, Mo or alloys thereof to assume a thickness in the range of 0.1 to 1 $\mu$m. As for materials or thickness of the supporting film 2 and the protecting film 4, the silicon nitride film might also be replaced by silicon oxide film, and the thickness might be in the range of 0.3 to 4 $\mu$m, similarly to Embodiment 1. The arrangement of the present embodiment is further adjusted such that a tensile stress is generated in a synthetic manner within the three layers of the supporting film, resistor film and the protecting film or the two layers of the supporting film and the protecting film.

Embodiment 12

Figure 19A:
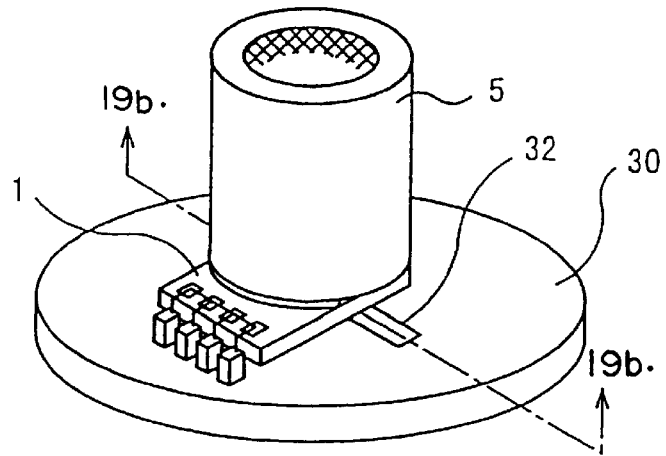
FIG. 19 is a view for explaining pressure sensors according to a twelfth and thirteenth embodiment of the present invention, wherein (a) is a perspective view showing a schematic appearance of the pressure sensor and (b) a sectional representative view seen from the direction D—D in the drawing.
Figure 19B:
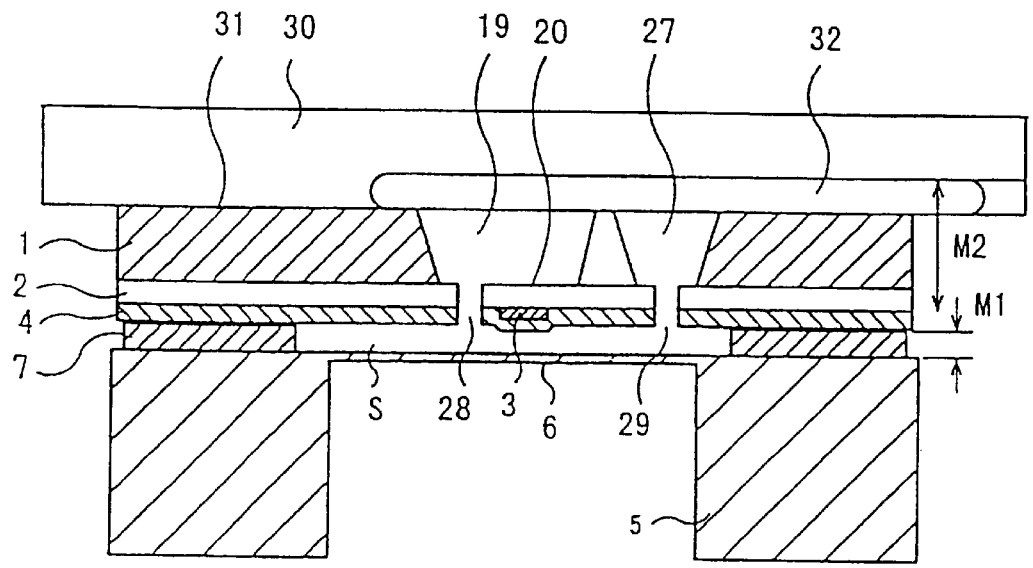

Another embodiment of the present invention will now be explained with reference to the drawings. FIG. 19 is a view showing an arrangement of the pressure sensor according to Embodiment 12 of the present invention wherein (a) is a perspective view showing a schematic appearance of the pressure sensor and (b) a sectional representative view seen from direction D—D in (a). While main portions of the sensor are identical to those explained in connection with FIG. 15 according to Embodiment 10 or FIG. 17 and FIG. 18 according to Embodiment 11, FIG. 19 illustrates an embodiment with a diaphragm arrangement in which the heat sensitive resistor portion of FIG. 10 according to Embodiment 10 is arranged. In the drawing, there are sequentially formed onto a plate-like base material 1 comprising, for instance, a silicon wafer, a heat-insulating supporting film 2 of, for instance, silicon nitride film, and a heat sensitive resistor film 3 (made, for instance, of platinum), and a protecting film 4 is formed as to cover the measuring portion of the heat sensitive resistor film 3. On the other hand, a diaphragm 6 for receiving pressure from measuring fluid is formed on a cylindrical body 5, and this diaphragm 6 and the measuring portion of the heat sensitive resistor film 3 are connected with spacers 7 being interposed therebetween to be disposed as to oppose each other at a specified distance. A caved portion 19 is formed in a scooping-out manner from a surface opposite to that of the measuring portion of the base material 1 on which the heat sensitive resistor film 3 is formed, and the heat sensitive resistor film is formed onto a diaphragm 20 comprising the supporting film 2 where the base material 1 is scooped out to form the concave portion 19. Numeral 27 denotes a caved portion which is simultaneously formed when forming the caved portion 19 and which is formed at a portion opposing the diaphragm 6 inside of the spacers 7. Numerals 28, 29 respectively denote etching holes formed on the protecting film 4 and the supporting film 2 of portions of the caved portions 19, 27 which might be formed through the same methods as that for the etching hole 21 of FIG. 17 according to Embodiment 7. Numeral 30 denotes a package for fixing the substrate on which the heat sensitive resistor potion is formed and for picking the electrodes out to the exterior, and is adhered to the base material 1 by means of adhesive 31. Numeral 32 denotes a groove formed on the surface of the package 31 and is formed as to extend from the portion opposing the portion of the caved portions 19, 27 to outside of the end of the substrate.

While methods of pressure measurement are identical to those explained for Embodiment 1, a through hole or a groove is formed in the present embodiment such that a gas within the clearance S between the diaphragm 6 receiving pressure and the heat sensitive resistor portion or within the caved portions 19, 27 are not confined therein. In case the spacers 7 are closed in an annular shape, the gas within the clearance S is confined so that the air pressure in the clearance S is increased in accordance with displacements in the diaphragm 6 whereupon the diaphragm 20 of the heat sensitive resistor portion is also displaced, thereby inhibiting measurement of correct pressure. The air pressure within the clearance S also varies in accordance with abrupt changes in temperature or variations in the external pressure so that noise signals are generated. Also in case the spacers 7 are not completely closed, the diaphragm 20 might be instantly displaced upon abrupt displacements in the diaphragm 6 when the clearance through which a gas might pass is small, thereby resulting in generation of noise signals. Since the gas within the clearance S is communicated to the exterior through the caved portion 19 and the etching hole 28 formed at a portion opposing the diaphragm 6 inside the spacers 7 in the present embodiment of the invention, fluctuations in pressure of the gas within the clearance S can be eliminated whereby it is possible to obtain a pressure sensor of constant sensitivity and of high reliability.

The etching hole 28 formed at the diaphragm 20 is advantageously used when it is necessary to follow abrupt fluctuations. When fixing a rear surface of the base material 1 of the detecting elements with the package 31, it is necessary to form a groove 32 or through holes for the same reason such that a gas in the interior of the caved portions 19, 27 are not confined.

Embodiment 13

One embodiment of the present invention will now be explained with reference to FIG. 19 which has been explained in the above Embodiment 12. The opposing distance between the second diaphragm 20 on which the heat sensitive resistor portion 3 is formed and the diaphragm 6 receiving pressure is defined as M1 in FIG. 19, and the distance between the second diaphragm 20 on which the heat sensitive resistor portion 3 is formed and an opposing surface of the package 30 is defined as M2. The flow of heat generated at the heat sensitive resistor film 3 is composed of (a) components which flow towards the substrate by passing through the second diaphragm 20 comprising the heat-insulating supporting film 2 and the protecting film 4, (b) components which flow towards the surface of the package 30 by passing through air within the caved portion 19 (wherein the distance is M2), and (c) components which flow towards the diaphragm 6 receiving pressure by passing through the air within the clearance S (wherein the distance is M1). The temperature of the heat sensitive resistor portion 3 is determined by the flow of these heat flows. When pressure is impressed on the diaphragm 6 and the distance M1 becomes narrower, the flow of heat is varied, which is detected as a signal. The smaller the heat flow of the above components (a)(b) which do not contribute to pressure sensitivity is, the smaller the amount of consumed electric power and the larger the sensitivity becomes. Fluctuations in sensitivity owing to these influences might also be made small. The longer the distance is, the larger the heat resistance and the smaller the heat flow becomes. The heat resistance of (b) and (c) is proportional to M1×M2/(M1+ M2) similar to the serially connected electric resistance, it is possible to reduce the heat flow of components (b) when compared to the heat flow of components (c) to an ignorable level by satisfying M2>>M1, and thus to reduce the amount of electric power which is consumed by these components to an ignorable level. In practice, by setting M2 five times as large as M1, influences of the manufacturing accuracy of M2 can be ignored to the utmost so that the increase in the amount of consumed electric power might be restricted to an approvable degree.

It should be noted that while the present Embodiment 13 has been explained based on a case in which the distance M2 is regulated for an arrangement including a package 31 with a groove 32 as shown in FIG. 19, M2 will be a sufficiently large value in the absence of the package so that it goes without saying that the condition M2>>M1 will be satisfied.

Embodiment 14

Figure 20:
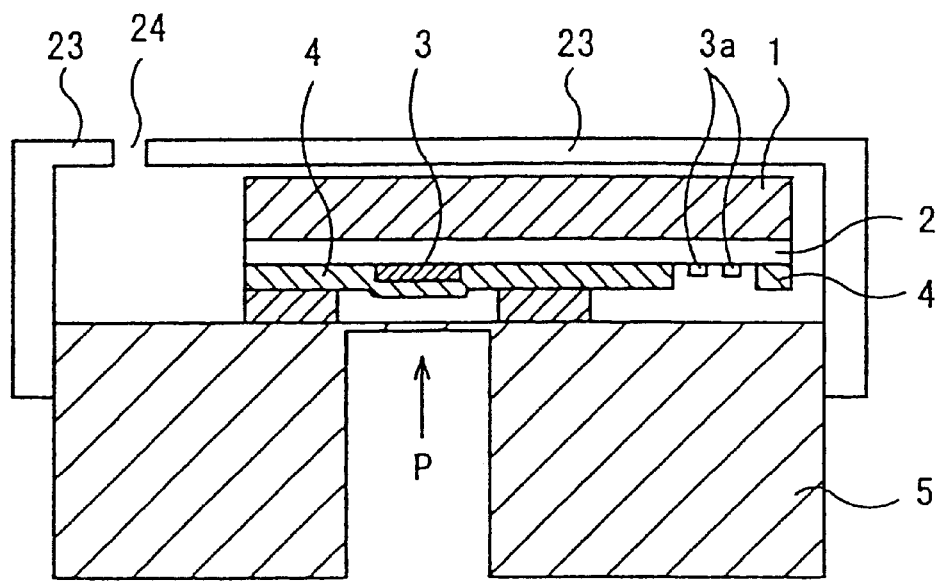
FIG. 20 is a schematic sectional view of a pressure sensor according to a fourteenth embodiment of the present invention.

One embodiment of the present invention will now be explained with reference to the drawings. The present embodiment is characterized in that a protecting cap is provided on the pressure detecting element portion of the pressure sensor explained in the above embodiment. The present embodiment will be explained based on a case in which the pressure sensor explained in connection with Embodiment 1 is provided with a protecting cap made of nylon, which is an insulating material. FIG. 20 is a sectional view of the pressure sensor according to Embodiment 14 of the present invention. In the drawing, main portions of the pressure sensor are identical to those explained in Embodiment 1, and numeral 2 denotes a heat-insulating type supporting film made, for instance, of silicon nitride formed on either surface of a plate-like base material 1 comprising, for instance, silicon wafer, onto which a heat sensitive resistor film 3 is formed. This heat sensitive resistor film corresponds to a heating portion which is used as an exothermic resistance, temperature-measuring resistance or comparative resistance and might, for instance, be formed of platinum. A protecting film 4 is formed as to cover a measuring portion of the heat sensitive resistor film. On the other hand, a diaphragm 6 for receiving pressure is formed on a cylindrical body 5, and spacers 7 are arranged such that the diaphragm 6 and the measuring portion of the heat sensitive resistor film 3 are disposed as to oppose each other at a specified distance. Numeral 23 denotes a protecting cap for protecting the thermal pressure detecting element and the diaphragm which receives measuring pressure from mechanical and electrical disturbances, which is arranged to cover the detecting element portion and which is disposed such that an inner surface of the cap contacts an outer periphery of the cylindrical body 5. At least one aperture 24 is formed on the protecting cap 23.

As explained above, since at least one aperture is formed on the protecting cap in the pressure sensor of the present embodiment, the pressure in the interior of the thermal pressure detecting element is identical to the pressure of the exterior. Therefore, since the pressure in the interior of the pressure detecting element portion is not varied owing to variations in the ambient temperature, the sensitivity of the thermal pressure detecting element can be maintained constant so that it is possible to obtain a pressure sensor of high reliability.

While the main portions of the pressure sensor of the above Embodiment 14 is exemplarily explained to be those of the example explained in Embodiment 1, the same effects might be obtained even by utilizing pressure sensors of different embodiments, that is, of Embodiments 2 to 13.

Embodiment 15

While the above Embodiment 14 has been explained based on a case in which a protecting cap having an aperture is utilized, the present embodiment is so arranged that the pressure of the interior of the protecting cap is regulated though not being formed with an aperture.

Figure 21:
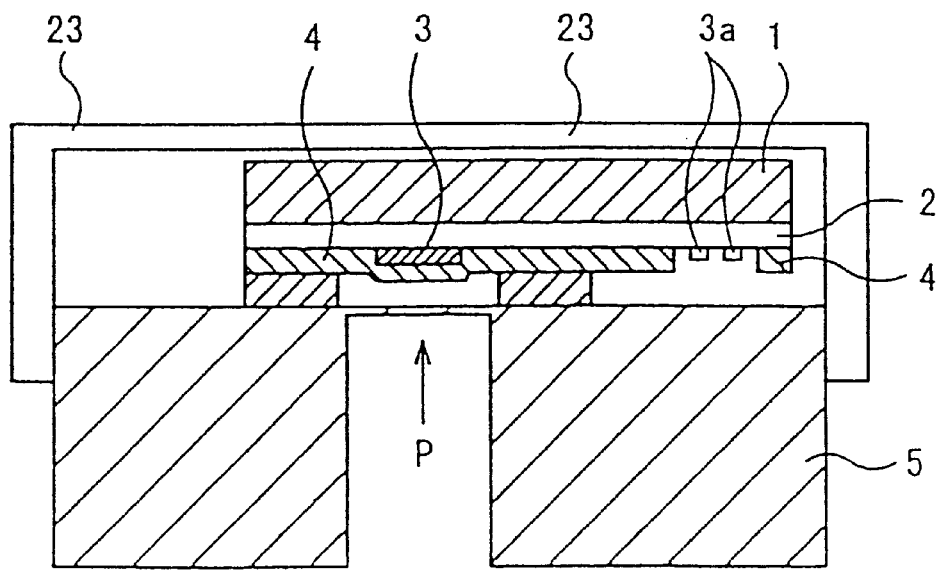
FIG. 21 is a schematic sectional view of a pressure sensor according to a fifteenth embodiment of the present invention.
Figure 22:
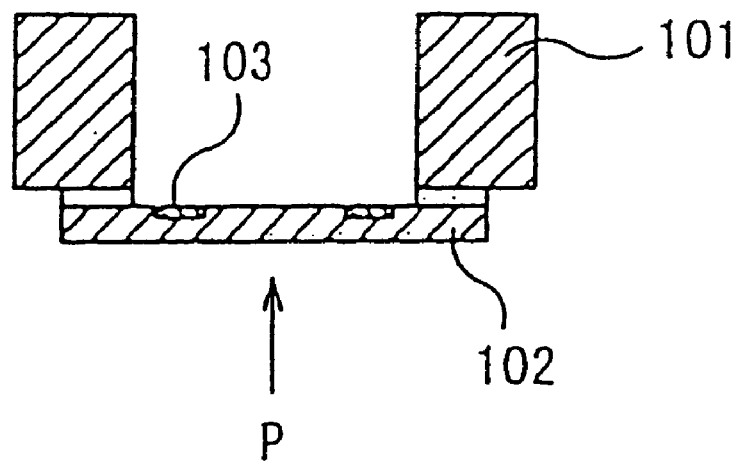
FIG. 22 is a sectional view of a conventional pressure sensor of which pressure-receiving surface is composed of a silicon substrate and wherein a strain gage is formed on the substrate.
Figure 23:
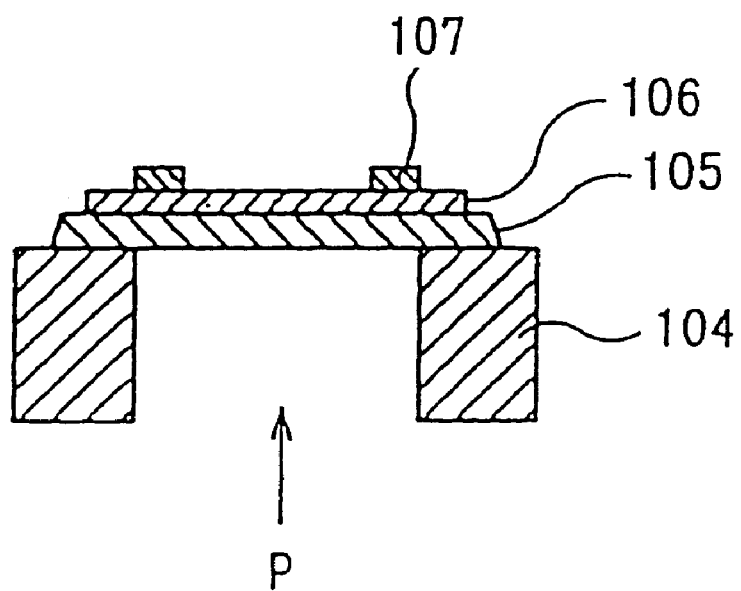
FIG. 23 is a sectional view of a conventional pressure sensor wherein a strain gage is formed on a pressure-receiving surface.
Figure 24A:
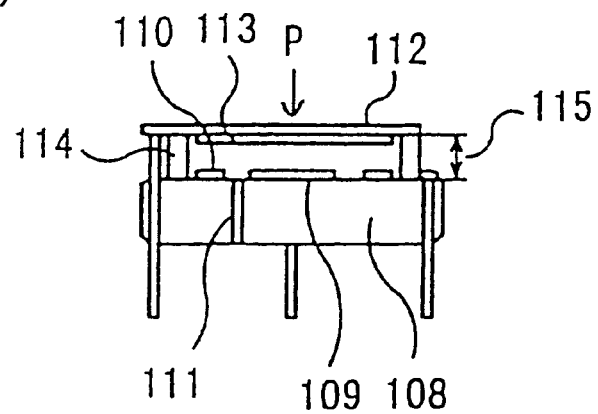
FIG. 24 is a sectional view showing a conventional pressure sensor of capacity type.
Figure 24B:
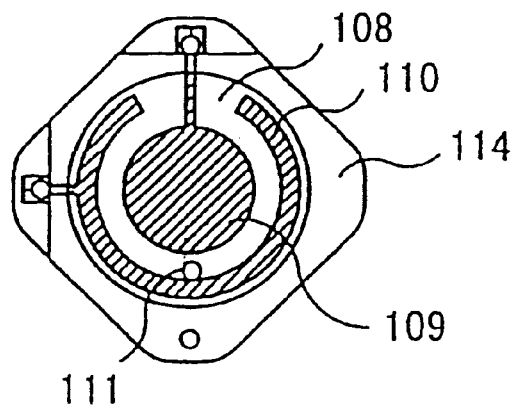
Figure 24C:
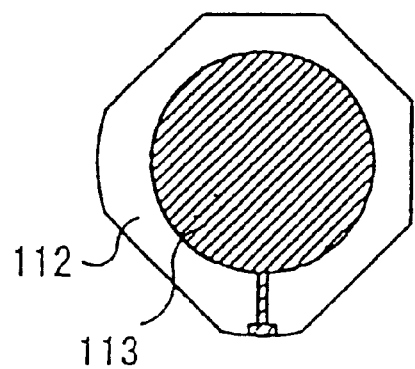

One embodiment of the present invention will now be explained with reference to the drawings. The present embodiment will be explained based on a case in which the pressure sensor explained in connection with Embodiment 1 is provided with a protecting cap. FIG. 21 is a sectional view of the pressure sensor according to Embodiment 15 of the present invention. In the drawing, main portions of the pressure sensor are identical to those explained in Embodiment 1, and numeral 2 denotes a heat-insulating type supporting film made, for instance, of silicon nitride formed on either surface of a plate-like base material 1 comprising, for instance, silicon wafer, onto which a heat sensitive resistor film 3 is formed. This heat sensitive resistor film corresponds to a heating portion which is used as an exothermic resistance, temperature-measuring resistance or comparative resistance and might, for instance, be formed of platinum. A protecting film 4 is formed as to cover a measuring portion of the heat sensitive resistor film. On the other hand, a diaphragm 6 for receiving pressure is formed on a cylindrical body 5, and spacers 7 are arranged such that the diaphragm 6 and the measuring portion of the heat sensitive resistor film 3 are disposed as to oppose each other at a specified distance. Numeral 23 denotes a protecting cap for protecting the thermal pressure detecting element and the diaphragm which receives measuring pressure from mechanical and electrical disturbances, which is arranged to cover the detecting element portion and which is disposed such that an inner surface of the cap contacts an outer periphery of the cylindrical body 5.

When providing a protecting cap, it is desirable that the pressure in the interior of the protecting cap seal is identical to atmospheric pressure or higher than atmospheric pressure. In case the pressure is higher than atmospheric pressure, it is preferable that the pressure is adjusted and sealed as to be a pressure lower than $\frac{1}{10}$ of the maximum pressure that the diaphragm would receive from the measuring fluid.

As explained so far, since the interior of the pressure detecting element is sealed by the protecting cap 23 to be at a pressure which is identical to atmospheric pressure or higher than atmospheric pressure, heat from the heat-generating portion might be efficiently transmitted to the diaphragm which receives measuring pressure whereby it is possible to obtain a pressure sensor of superior sensitivity.

While the main portions of the pressure sensor of the above Embodiment 15 is exemplarily explained to be those of the example explained in Embodiment 1, the same effects might be obtained even by utilizing pressure sensors of different embodiments, that is, of Embodiments 2 to 13.

Embodiment 16

While the above Embodiment 15 has been explained based on a case in which gas of a pressure which is identical to atmospheric pressure or higher than atmospheric pressure is sealed into the protecting cap for improving the sensitivity, the present Embodiment 17 utilizes, as a sealing gas, He or Ne having a higher thermal conductivity than air. The sensitivity of the sensor is largely dependent on the thickness of the spacers (M1) wherein the narrower M1 becomes, the more the sensitivity is improved. However, a controllable thickness of the spacers is substantially determined by materials or processes for forming, so that the thinning thereof is quite limited. In case of using, for instance, He as a sealing resin instead of air, the distance M1 can be practically reduced to ⅕ since the thermal conductivity of He is not less than five times as that of air, so that it is possible to improve the sensitivity for five times or more. Further, when setting the pressure to not less than atmospheric pressure as in Embodiment 15, the sensitivity can be still further improved.

INDUSTRIAL APPLICABILITY

The pressure sensor according to the present invention might be applied as a pressure sensor, for instance, for detecting hydraulic pressure of brakes for vehicles, for detecting fuel pressure for controlling engines, for detecting hydraulic pressure for transmissions, or for detecting pressure of refrigerants of air conditioners or refrigerators.

What is claimed is:

1. A pressure sensor comprising:

a first diaphragm including, a first surface configured to receive pressure, and a thermal detecting portion disposed opposite a second surface of the first diaphragm, wherein displacement values of the first diaphragm owing to variations in pressure are thermally detected by the thermal detecting portion due to changes in heat flow from the thermal detecting portion to the first diaphragm.

2. The pressure sensor of claim 1, wherein the thermal detecting portion includes a heating mechanism configured to heat, and displacement values of the first diaphragm are measured by variations in resistance values of the thermal detecting portion.

3. The pressure sensor of claim 1, wherein the thermal detecting portion includes a heating mechanism configured to heat to a specified temperature, and displacement values of the first diaphragm are measured by variations in current values of the thermal detecting portion.

4. The pressure sensor of claim 1, wherein the thermal detecting portion is smaller in size than the first diaphragm.

5. The pressure sensor of claim 1, wherein the thermal detecting potion includes a heating mechanism configured to heat, and further includes a temperature detecting portion adjacent to the heating mechanism, and displacement values of the first diaphragm are measured by variations in temperature of the temperature detecting portion.

6. The pressure sensor of claim 1, further comprising:

a temperature compensating mechanism configured to measure and compensate an ambient temperature.

7. The pressure sensor of claim 6, further comprising:

a second temperature compensating mechanism configured to measure and compensate a temperature of the diaphragm.

8. The pressure sensor of claim 1, further comprising:

a second thermal detecting portion disposed opposite an end portion of the second surface of the first diaphragm.

9. The pressure sensor of claim 8, wherein the first thermal detecting portion and the second thermal detecting portion comprise a bridge circuit.

10. The pressure sensor of claim 1, wherein the thermal detecting portion is formed in a concave portion of the substrate, and the diaphragm and the thermal detecting portion are disposed opposite each other through the concave portion of the substrate.

11. The pressure sensor of claim 1, further comprising:

spacers configured to regulate an opposing distance between the thermal detecting portion and the first diaphragm, provided on a substrate on which the thermal detector portion is formed.

12. The pressure sensor of claim 1, further comprising:

a second diaphragm at least a part of which is supported on a first surface of a silicon substrate, wherein the thermal detecting portion is arranged on the second diaphragm.

13. The pressure sensor of claim 12, wherein the second diaphragm forms a bridge arrangement with respect to the silicon substrate.

14. The pressure sensor of claim 12, wherein the silicon substrate includes a void formed on a side of a second surface of said substrate, and a length of the void from a second diaphragm surface in a normal direction is set larger than a distance between the second diaphragm and the first diaphragm.

15. The pressure sensor of claim 13, wherein a void is formed on a side of the second surface of the silicon substrate, and a length of the void from a second diaphragm surface in a normal direction is set larger than a distance between the second diaphragm and the first diaphragm.

16. The pressure sensor of claim 1, further comprising:

a protecting portion covering the thermal detecting portion.

17. The pressure sensor of claim 16, wherein a pressure of an interior of the protecting portion is set at atmospheric pressure or higher than atmospheric pressure.

* * * * *